(12) United States Patent
Adapa et al.

(10) Patent No.: US 12,395,407 B2
(45) Date of Patent: Aug. 19, 2025

(54) DEVICES AND METHODS FOR NETWORK DATA MONITORING AND EXTRACTION

(71) Applicant: IP Infusion Inc., Santa Clara, CA (US)

(72) Inventors: Ajith Adapa, Fremont, CA (US); Shaji Ravindra Nathan, Union City, CA (US)

(73) Assignee: IP Infusion Inc., Santa Clara, CA (US)

( * ) Notice: Subject to any disclaimer, the term of this patent is extended or adjusted under 35 U.S.C. 154(b) by 0 days.

(21) Appl. No.: 18/646,618

(22) Filed: Apr. 25, 2024

(65) Prior Publication Data
US 2024/0364592 A1 Oct. 31, 2024

Related U.S. Application Data

(60) Provisional application No. 63/498,363, filed on Apr. 26, 2023, provisional application No. 63/498,413, filed on Apr. 26, 2023, provisional application No. 63/498,361, filed on Apr. 26, 2023, provisional application No. 63/498,417, filed on Apr. 26, 2023.

(51) Int. Cl.
*H04L 41/14* (2022.01)
*H04L 41/0894* (2022.01)

(52) U.S. Cl.
CPC .......... *H04L 41/0894* (2022.05); *H04L 41/14* (2013.01)

(58) Field of Classification Search
CPC .............................. H04L 41/0894; H04L 41/14
See application file for complete search history.

(56) References Cited

U.S. PATENT DOCUMENTS

| | | | |
|---|---|---|---|
| 11,374,838 B1 | 6/2022 | Finkelshtein et al. | |
| 2007/0106605 A1* | 5/2007 | Kaplan | G06Q 20/102 |
| | | | 705/40 |
| 2014/0233385 A1* | 8/2014 | Beliveau | H04L 47/122 |
| | | | 370/235 |
| 2018/0139104 A1* | 5/2018 | Seddigh | H04L 41/12 |
| 2019/0045036 A1* | 2/2019 | Rahat | H04L 67/561 |
| 2020/0106744 A1* | 4/2020 | Miriyala | H04L 41/142 |
| 2020/0177638 A1* | 6/2020 | Salman | H04L 63/205 |
| 2021/0351948 A1 | 11/2021 | Lewis et al. | |
| 2024/0267317 A1* | 8/2024 | Ameling | H04L 43/062 |

FOREIGN PATENT DOCUMENTS

EP 3382989 A1 10/2018

OTHER PUBLICATIONS

IP Infusion Inc., PCT/US2024/026661, International Search Report and Written Opinion, Jul. 29, 2024, 14 pgs.

* cited by examiner

*Primary Examiner* — Gil H. Lee
(74) *Attorney, Agent, or Firm* — Morgan, Lewis & Bockius LLP

(57) ABSTRACT

This disclosure describes methods, devices and systems for anomaly detection and policy enforcement. An example network server includes a network interface component configured to obtain network packets in real time from a router device. The network server also includes a data processing unit configured to extract packet metadata from the network packets. The network server further includes a policy component configured to provide a policy rule to the router device, the policy rule generated based on an analysis of the packet metadata.

20 Claims, 16 Drawing Sheets

Sync-Request ~ 640

| Message Type (0x64) 752-1 | Message Length 754-1 | 0x0 | SYNC-REQ 758 | RESV 760-1 |

Sync-Reply ~ 642

| Message Type (0x64) 752-2 | Message Length 754-2 | Table-Version 762-1 | SYNC-REP 764 | RESV 760-2 | Policy-Object 1 | ... | Policy-Object n |

Policy Add ~ 644

| Message Type (0x64) 752-3 | Message Length 754-3 | Table-Version 762-2 | ADD 766 | RESV 760-3 | Policy-Object 1 | ... | Policy-Object m |

Policy Delete ~ 646

| Message Type (0x64) 752-4 | Message Length 754-4 | Table-Version 762-3 | DEL 768 | RESV 760-4 | Policy-ID 1 | ... | Policy-ID p |

Policy Delete All ~ 648

| Message Type (0x64) 752-5 | Message Length 754-5 | Table-Version 762-4 | DEL 770 | RESV 760-5 |

Figure 7B

DEVICES AND METHODS FOR NETWORK DATA MONITORING AND EXTRACTION

PRIORITY AND RELATED APPLICATIONS

This application claims priority to:
U.S. Provisional Patent Application No. 63/498,361, entitled "Devices and Methods for Network Data Monitoring and Extraction," filed Apr. 26, 2023,
U.S. Provisional Patent Application No. 63/498,363, entitled "Devices and Methods for Anomaly Detection," filed Apr. 26, 2023,
U.S. Provisional Patent Application No. 63/498,413, entitled "Devices and Methods for Network Data Classification," filed Apr. 26, 2023, and
U.S. Provisional Patent Application No. 63/498,417, entitled "Devices and Methods for Network Policy Enforcement," filed Apr. 26, 2023, each of which are hereby incorporated by reference in its entirety.

TECHNICAL FIELD

This application relates generally to network data monitoring and extraction, including but not limited to, systems and methods for anomaly detection and policy enforcement.

BACKGROUND

Current network operating systems use standard protocols such as netflow or sflow to provide telemetry data. The analysis of the telemetry data can then be performed offline by a dedicated network analytics platform. The output of the network analytics can then be fed into a network management system or software defined controller. The controller can use the management plane or protocols like border gateway protocol to enforce the policies. The policies are pre-defined by the network administrator.

Alternately, a dedicated device such as a network intrusion prevention system can be placed in-line with the network device. This device can perform the above functions based on statistical analysis of packet metadata. However, new signatures have to be derived after a network attack is analyzed to prevent similar future events. These methods do not provide adequate protection against day zero or advanced persistent threats in a pre-emptive or in a real time manner.

The advent of network disaggregation (vertical and horizontal) has brought new challenges as there are a number of closed-source third-party software components (e.g., embedded firmware and/or sdk software) as well as open-source components that together form a routing or a switching system. In this way, there are multiple subcomponents that make the systems vulnerable. Additionally, the data network speeds have increased as well, which increases the complexity for existing systems.

SUMMARY

Accordingly, there is a need for security systems and methods for preemptive detection and isolation of security threats (e.g., volumetric DDOS, protocol attacks such as OSI data link, network, transport layers, and/or zero-day attacks) on a network operating system and its subsystems (e.g., control, data and management planes) by real time analysis of packet metadata.

The present disclosure describes network components (e.g., a traffic collector component, a machine learning component, and policy component) that provide security protection against distributed denial of service (DDOS), protocol anomalies, zero-day attacks and other software vulnerabilities and anomalies. An example system described herein collects logging, protocol, and/or packet metadata and makes a time series profile of the network elements and the network operations to form a behavioral model. In this example, this model is used for anomaly detection to auto-generate mitigation policies. These policies may be sent across the network via a wire protocol to the monitored network end points. A policy agent in the network element may implement these policies in real time. The example system may be configured for anomaly detection (e.g., security and traffic engineering), root cause analysis (e.g., system failure analysis), predictive maintenance (e.g., predicting failures with auto-mitigation for service uptimes), dynamic network optimization (e.g., optical, radio, and packet networks), automating network operations (e.g., traffic engineering and network routing operations), SLA assurance, trouble ticket classification, and/or churn prediction based on QoS metrics.

According to some embodiments, a method of anomaly mitigation includes: (i) obtaining metadata for a plurality of network packets; (ii) obtaining operating information corresponding to one or more network devices; (iii) detecting an anomaly in the plurality of network packets by analyzing the obtained metadata; (iv) generating, without human interaction, a policy rule based on the detected anomaly; and (v) enforcing the policy rule at the one or more network devices.

According to some embodiments, a network device includes: (i) a network interface component configured to obtain network packets in real time from a router device; (ii) a data processing unit configured to extract packet metadata from the network packets; and (iii) a policy component configured to provide a policy rule to the router device, the policy rule generated based on an analysis of the packet metadata.

According to some embodiments, a method of policy enforcement includes, at a router device comprising memory and control circuitry: (i) enforcing one or more policy rules at the router device; and (ii) while enforcing the one or more policy rules: (a) receiving, via a policy agent, an additional policy rule from a policy server; and (b) implementing, via the policy agent, the additional policy rule by adjusting a data plane at the router device.

According to some embodiments, a method of anomaly detection includes: (i) obtaining incoming network data for a network device, the networking data including operating information for the network device and packet metadata; (ii) classifying the incoming network data using one or more machine learning models, including identifying abnormal network data from the incoming network data; and (iii) causing a policy rule to be generated based on the abnormal network data.

Thus, methods, devices, and systems disclosed herein provide anomaly detection and policy enforcement in network devices. Such methods, devices, and systems may complement or replace conventional methods for anomaly detection and/or policy enforcement.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 7A-7B illustrate example policy communications in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Network traffic data may be logged; however, the amount of network data is rapidly increasing making it too grater to actively monitor. For example, a 100 Gbps connection allows a single pathway to present one valid 64-octet IP packet every 5 nanoseconds. The network data may be in the range of exabytes, and the activity is happening at nearly the speed of light, resulting in considerable challenges with tracking and managing in real time.

The present disclosure describes improved means for network security, routing/switching, network management, and fault analysis. The present disclosure also includes description of protocol and network security, dynamic optimization, and autonomous network operations. Advantages may include one or more of: improved response time (e.g., real-time) for fault analysis and mitigation, autonomous policy generation and enforcement, scaling for next generation traffic densities (e.g., 400/800 gigabits per second (Gbps) to terabits per second (Tbps) scale), and distributed architecture that interworks with existing systems without requiring replacement of the existing system components.

Figure 1A:
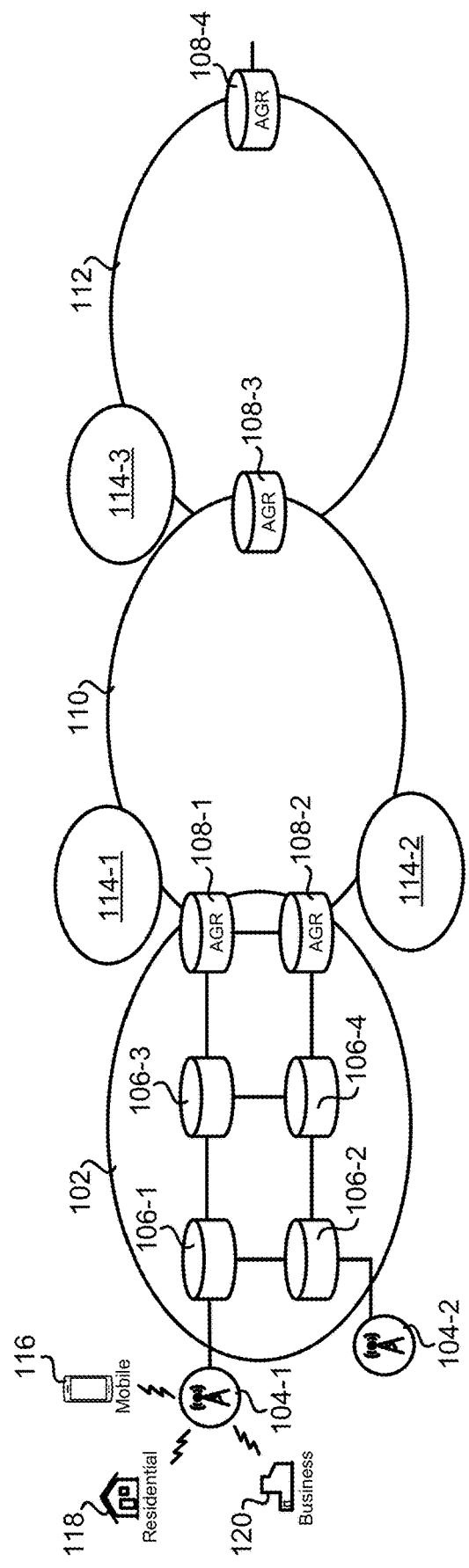
FIG. 1A illustrates an example service provider network in accordance with some embodiments.

FIG. 1A illustrates an example service provider network in accordance with some embodiments. As shown in FIG. 1A an access network 102 is coupled to edge providers 104 (e.g., a 5G new radio (NR) tower or a 4G evolved node B (eNB)). Each edge provider 104 may be communicatively coupled to one or more mobile devices 116, residential locations 118, and/or business locations 120. The access network 102 includes multiple access control routers 106 and multiple aggregation routers 108. The aggregation routers 108 communicatively couple the access network 102 to an aggregation network 110 and optionally one or more edge cloud networks 114. The aggregation network 110 may be a multiprotocol label switching (MPLS) network and/or a backhaul network. The aggregation network 110 is coupled to cloud network 114-3 and network 112. The network 112 may be an MPLS network and/or a core IP network. The network 112 may be coupled to one or more additional networks (e.g., the Internet). In some embodiments, the aggregation network 110 is a 4G/5G aggregation network.

Figure 1B:
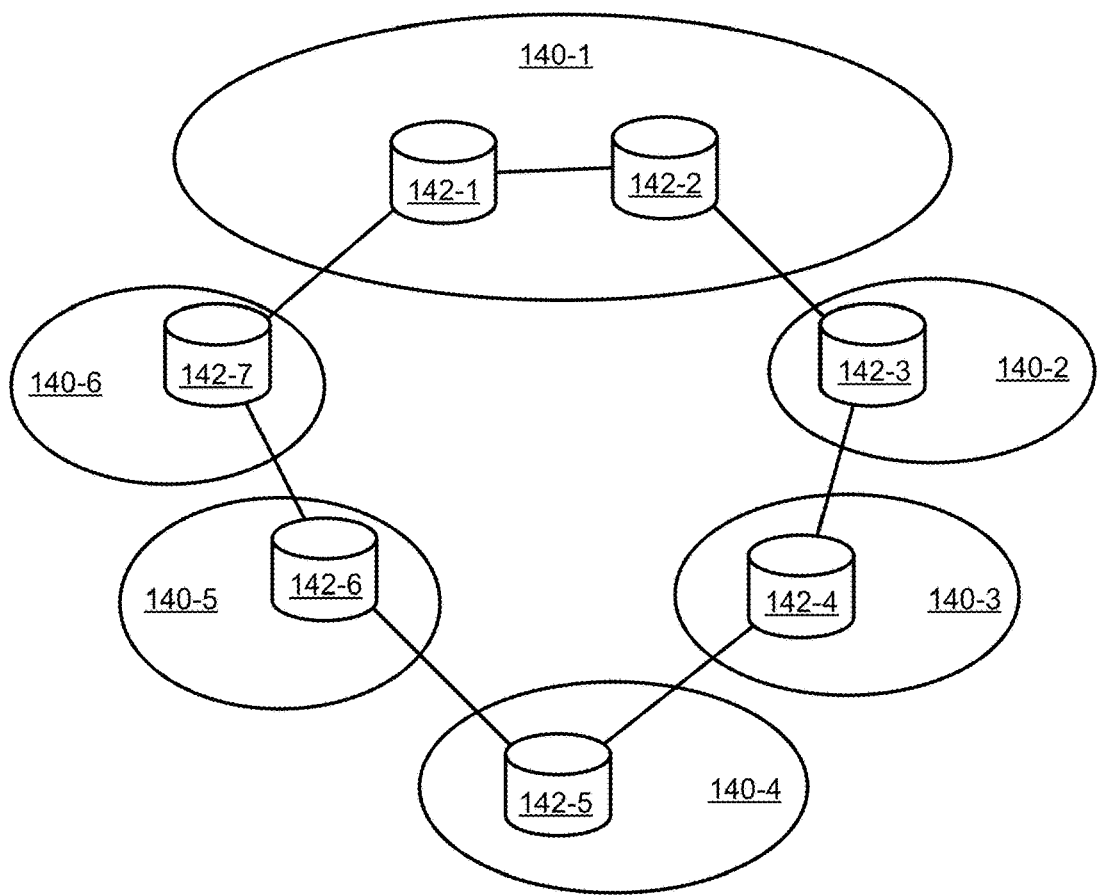
FIG. 1B illustrates an example of border gateway protocol peering in accordance with some embodiments.

FIG. 1B illustrates an example of border gateway protocol peering in accordance with some embodiments. FIG. 1B shows multiple networks 140 coupled to one another. Each network 140 includes a router 142. With border gateway protocol (BGP) routing decisions are made autonomously based on network paths, network policies, and/or rule sets configured by a network administrator. For example, the BGP routing guides Internet protocol (IP) packets from an end user to a final destination across the internet. BGP allows coordination between different networks that interconnect into a single global communication infrastructure (e.g., the Internet). BGP provides a standardized way to exchange routing and reachability information among networks (e.g., autonomous systems). BGP attacks can route traffic to a malicious server and/or cause routing delays/failures.

Figure 1C:
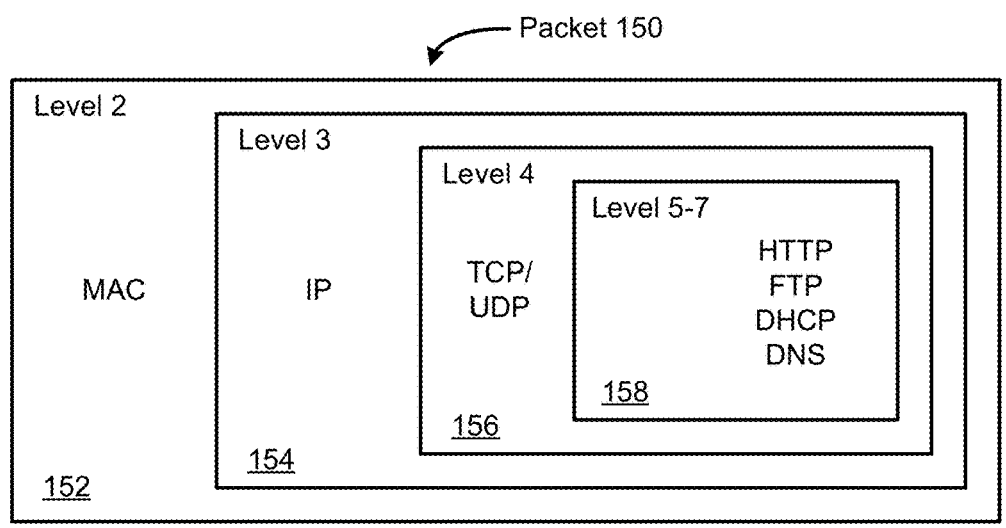
FIG. 1C illustrates an example network packet in accordance with some embodiments.

FIG. 1C illustrates a network packet 150 in accordance with some embodiments. The network packet 150 includes a media access control (MAC) level 152 (e.g., containing physical addresses), an IP level 154 (e.g., containing logical IP addresses), a TCP/UDP level 156 (e.g., containing port numbers), and HTTP, FTP, DHCP, and/or DNS levels 158 (e.g., containing the data to be transmitted). The various levels of the network packet 150 are used to route the network packet 150 from the end user to the final destination.

Figure 2:
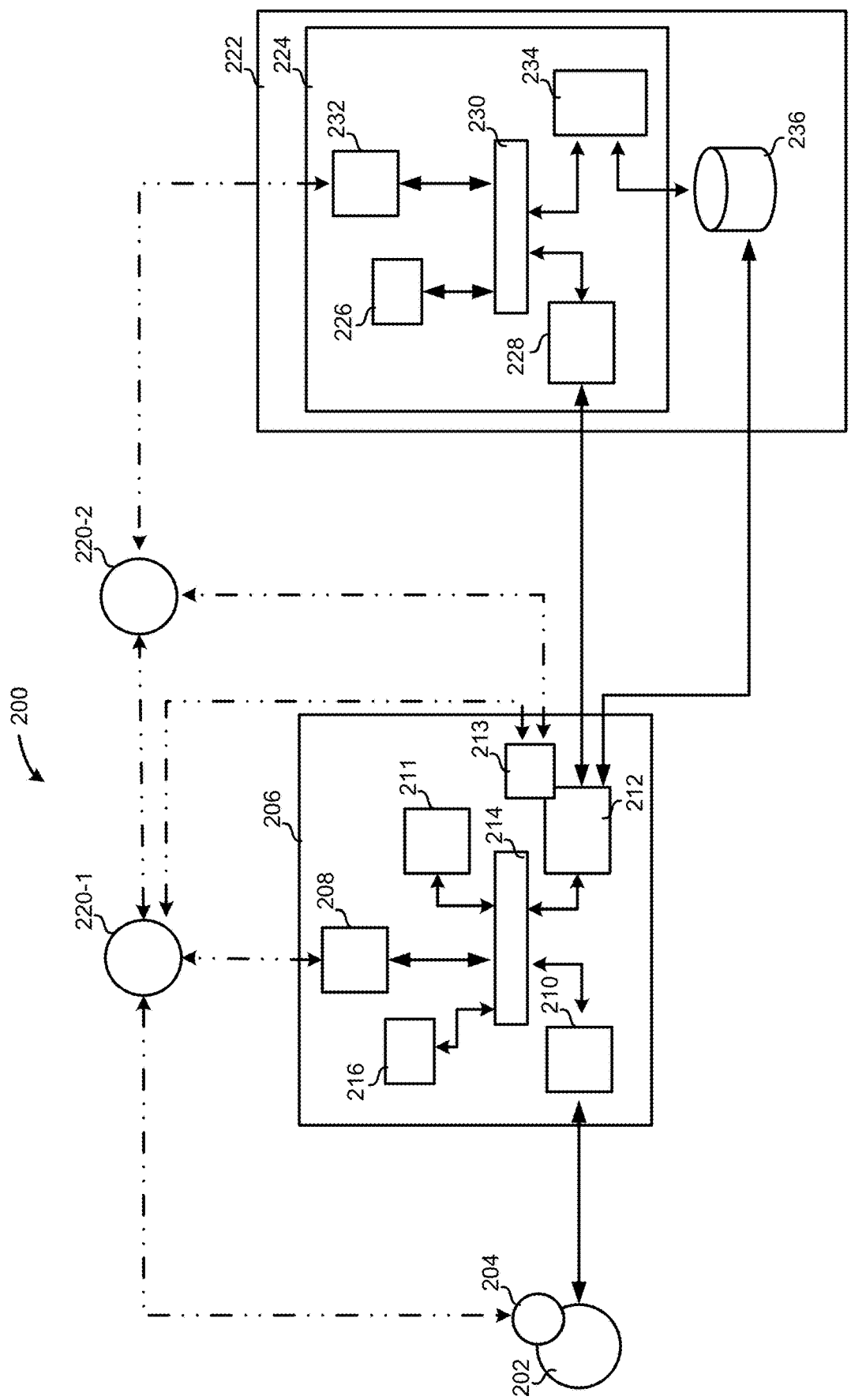
FIG. 2 illustrates an example network architecture in accordance with some embodiments.

FIG. 2 illustrates a network system 200 in accordance with some embodiments. The network system 200 includes a network device 202 (e.g., a router device), a near-edge network server 206, and a far-end datacenter 222. The network system 200 also includes policy servers 220 (e.g., including a centralized policy server). In some embodiments, the network system 200 is configured for system monitoring (e.g., anomaly detection, root cause identification, and/or predictive maintenance), managed services (e.g., trouble ticket classification, churn prediction, and/or SLA assurance), and/or intelligent networking (e.g., self-healing networks, dynamic optimization, and/or network design automation). In some embodiments, the network system 200 corresponds to a cellular, Internet, and/or optical network. In accordance with some embodiments, the network device 202 includes a policy agent 204. The network device 202 is communicatively coupled to the near-edge network server 206 (e.g., via a 10, 25, 40, 100, or 400G connection) and to the policy server 220-1. In some embodiments, the network device 202 includes a worker node. In some embodiments, the worker node of the network device 202 hosts the policy agent 204. In some embodiments, the policy agent 204 is used for communication with the policy server and enforcing the policies in a data plane of the network device 202.

The near-edge network server 206 includes a network interface 210 (e.g., a smart network interface card (NIC)), one or more processors 216 (e.g., one or more CPUs), one or more data processors 212 (e.g., one or more DPUs), optionally one or more parallel processors 211 (e.g., one or more GPUs), a policy agent 208, and optionally a policy server 213. In some embodiments, the policy agent 208 is used for network server management purposes, e.g., to configure and deploy the data and AI/ML pipelines as per a user configuration from a dashboard. In some embodiments, the components of the near-edge network server 206 are communicatively coupled to one another via a communication bus 214 (e.g., a PCI-express bus). The near-edge network server 206 is communicatively coupled to the network device 202, the policy server 220-1, the policy server 220-2, and the far-end datacenter 222. In some embodiments, the one or more parallel processors 211 are configured to perform network analysis and/or machine learning (e.g., represent an instance of the operations device 404). In some embodiments, the near-edge network server 206 communicates with the far-end datacenter 222 via a remote DMA connection. In some embodiments, the policy server 213 includes only a subset of the functionality of the policy servers 220. In some embodiments, the policy server 213 communicates with other policy servers (e.g., the policy servers 220) and maintains the policy rules for the router devices which are directly communicating with it.

The far-end datacenter 222 is communicatively coupled to the near-edge network server 206 (e.g., via a 20/30 km RDMA over converged ethernet (RCoE) v2 connection) and the policy server 220-2. The far-end datacenter 222 includes a far-edge network server 224 and one or more databases 236 (e.g., a flash storage). The far-edge network server 224 includes a network interface 228 (e.g., a smart network interface card (NIC)), one or more processors 226 (e.g., one or more CPUs), one or more parallel processors 234 (e.g., one or more GPUs), and a policy agent 232. In some embodiments, the components of the far-edge network server 224 are communicatively coupled to one another via a communication bus 230 (e.g., a PCI-express bus).

In some embodiments, the network interface 210 perform pre-processing of the network data from the network device 202. In some embodiments, the network interface 210 provides the network data (or pre-processed network data) to the data processor(s) 212 via the bus 214. In some embodiments, the data processor(s) 212 (e.g., a data processing unit) performs a detailed analysis of the network data and generates machine-learning (ML) dataset(s) for use by an ML inference model. In some embodiments, the ML dataset(s) are stored in a database at the near-edge network server 206 (e.g., a database associated with the data processor(s) 212). In some embodiments, the parallel processor(s) 212 execute an ML inference model that takes the ML dataset(s) as inputs and performs computations to generate policies on anomaly detection. In some embodiments, the generated policies are shared with the policy server 213 for storage, distribution, and/or enforcement. In some embodiments, the data processor(s) 212 transmit raw packet data and ML datasets to the database 236 for storage and optionally for future ML training (e.g., at the far-end datacenter 222). In some embodiments, the data processor(s) 212 transmit only ML datasets to the network interface 228 (e.g., which updates the hosted database in the network server(s) 224). In some embodiments, the network server(s) 224 are configured to handle scheduling of respective parallel processor(s) 234 to perform ML model training based on ML datasets in the hosted database.

In some embodiments, network packet data (and device operating data) is sent from the network device 202 to the near-edge network server 206 via the network interface 210. The network packet data is routed (forwarded) through the communication bus 214 to the data processor(s) 212. In embodiments where the near-edge network server 206 includes the parallel processor(s) 211, processed network data (e.g., ML datasets) is routed through the communication bus 214 to the parallel processor(s) 211 for analysis and machine learning. The data processor(s) 212 transmit the network packet data (and/or data derived from the network packet data) to the network interface 228 and/or the database(s) 236. The network interface 228 provides the data to the parallel processor(s) 234 via the communication bus 230. The parallel processor(s) 234 may obtain network data (e.g., past network data) from the database(s) 236 and/or store analysis results and processed data at the database(s) 236.

In some embodiments, policy messages are transmitted between the policy servers 220 and 213 and the policy agents 204, 208, and 232. For example, policy requests are sent from the policy agents to the policy servers and policy replies are sent from the policy servers in response (e.g., as discussed below with respect to FIGS. 6A-6C). In some embodiments, the policy agent 204 communicates with the policy server 213 via the network interface 210. In some embodiments, the policy servers communicate with one another (e.g., to relay status/policy information). In some embodiments, the policy agents are configured to implement policy rules at the control plane. In some embodiments, the policy agents are configured to implement policy rules by configuring ternary content-addressable memory (TCAM) at the network devices. In some embodiments, the policy agents are configured to delete obsolete rules (e.g., in response to instructions from a policy server). In some embodiments, the policy servers are configured to localize policy rules (e.g., do not propagate policy rules to devices where the rules don't apply).

Figure 3A:
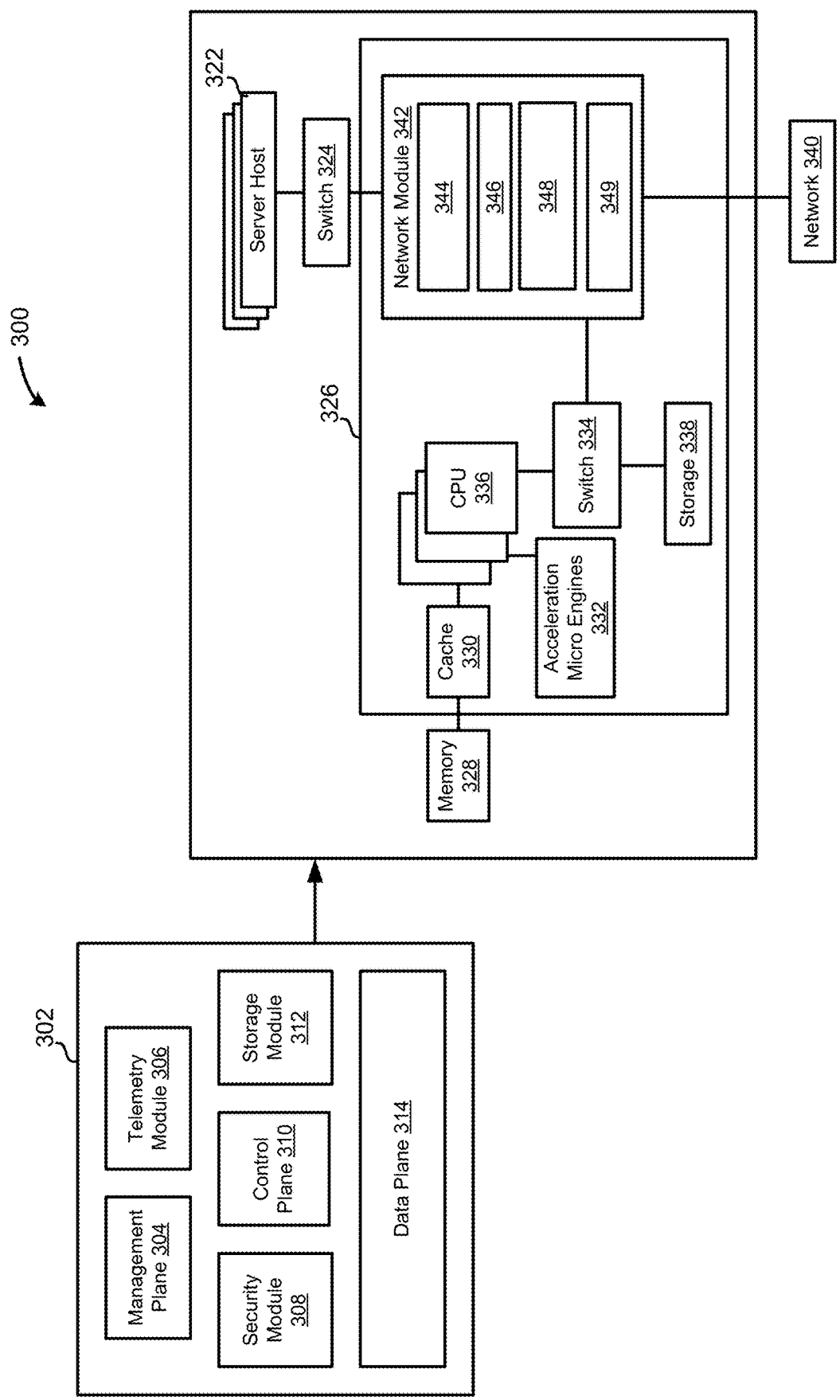
FIGS. 3A-3B illustrate example data processing unit components in accordance with some embodiments.
Figure 3B:
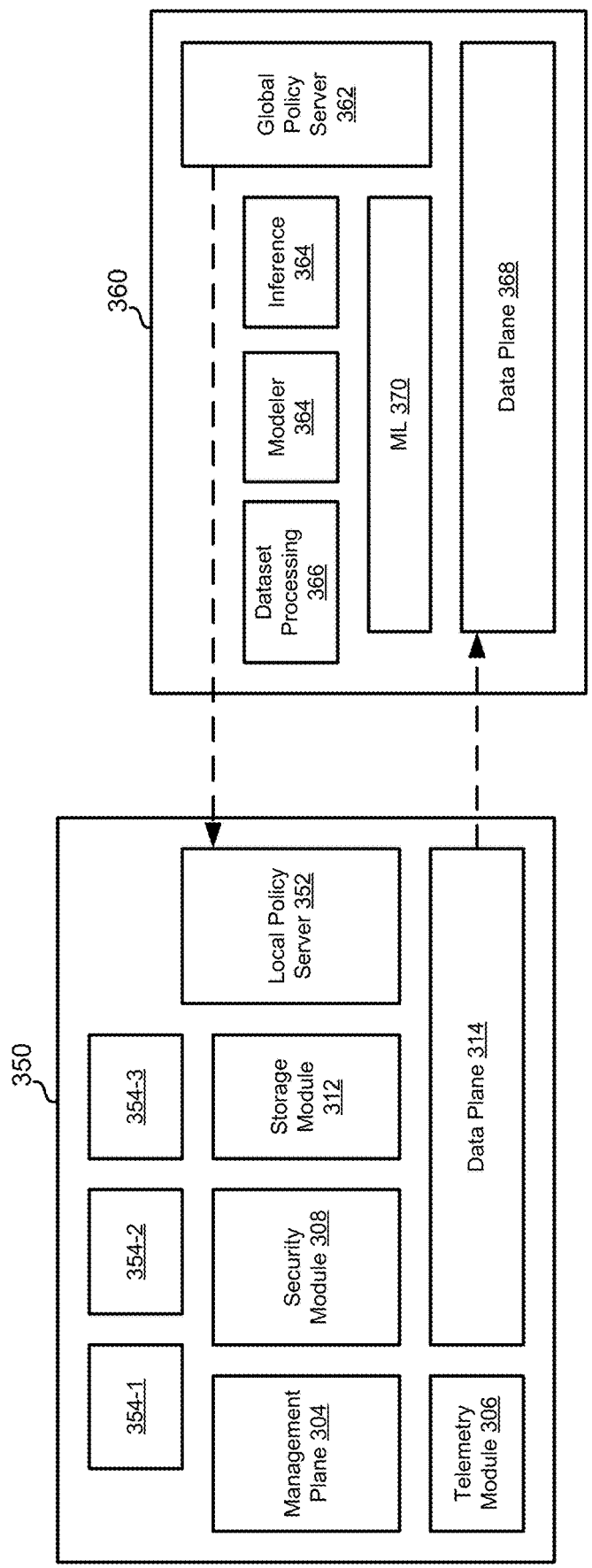

FIGS. 3A-3B illustrate example data processing unit components in accordance with some embodiments. FIG. 3A shows a data processing unit (e.g., an instance of the DPU 212) including components 302 (e.g., software components), memory 328 (e.g., DRAM), a switch 324 (e.g., a PCIe switch), and components 326 (e.g., hardware components). The components 302 includes a management plane 304, a control plane 310, a data plane 314, a telemetry module 306, a security module 308, and a storage module 312. The components 326 include a network module 342, processors 336, a cache 330, micro engines 332, and a switch 334 (e.g., a PCIe switch). The switch 334 is coupled to a storage 338 and/or a parallel processor (e.g., a GPU). In some embodiments, the storage 338 is separate from the data processing unit (e.g., the data processing unit is coupled to a remote storage). The network module 342 is coupled to one or more networks 340. The network module 342 includes one or more data path accelerators 344, an RDMA/TCP/UDP component 346, a pack switching/processing accelerator 348, and an ethernet Mac/Phys component 349. In some embodiments, the data processing unit 300 includes a programmable datapath accelerator. In some embodiments, the data processing unit 300 has a bandwidth in the range of 200 Gb/s to 800 Gb/s. In some embodiments, the data processing unit 300 includes a plurality of DDR channels. In some embodiments, the data processing unit 300 includes an embedded application-specific integrated circuit (ASIC). In some embodiments, the micro engines 332 are implemented on a data plane. The components 326 are coupled to a plurality of server hosts 322 via the switch 324.

FIG. 3B shows a data processing unit 350 communicatively coupled to a parallel processing unit 360 (e.g., a GPU). The data processing unit (DPU) 350 includes the management plane 304, the security module 308, the storage module 312, the data plane 314 (e.g., for real-time telemetry), and the telemetry module 306. The DPU 350 also includes a local policy server 352 and multiple tenancies 354. In some embodiments, each tenancy 354 is a separate virtual machine and/or a separate security group. In some embodiments, the DPU 350 is configured for traffic analysis, route optimization, and/or micro-segmented security. The parallel processing unit 360 includes a global policy server 362 (e.g., configured to generate policy rules based on inferences), an inference module 364 (e.g., configured to provide inferences based on network data analysis), a modeler 364 (e.g., configured to train and/or evaluate machine learning models), a dataset processing module 366 (e.g., an ETL module), a machine learning module 370, and a data plane 368. In some embodiments, the ETL module is separate from the dataset processing module 355 (e.g., the ETL module generates ML datasets and the dataset processing module reads the datasets to be processed by an ML module). In some embodiments, the parallel processing unit 360 is configured for automated, real-time policy control and response.

Figure 4A:
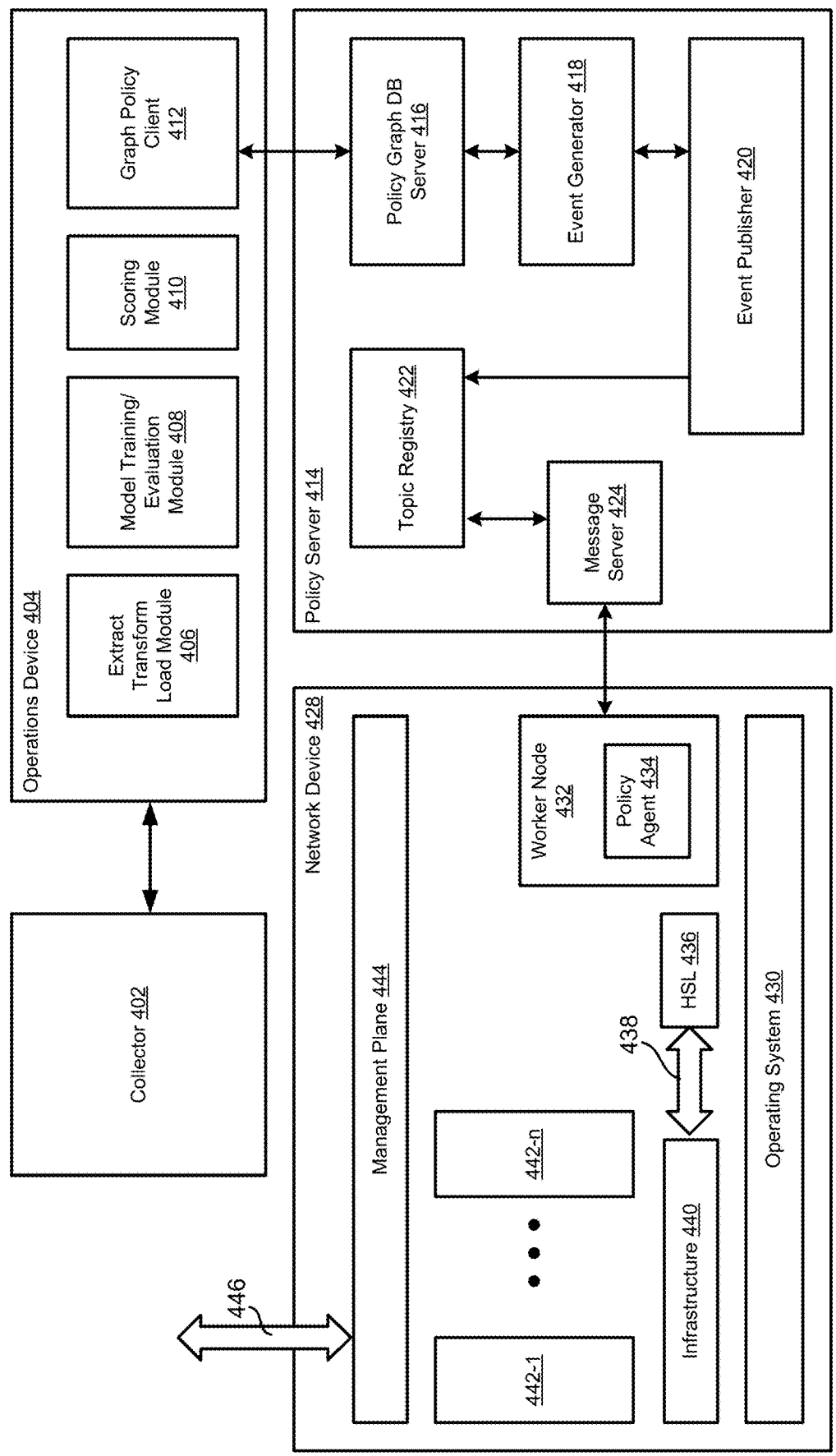
FIGS. 4A-4B illustrate example network operating system components in accordance with some embodiments.
Figure 4B:
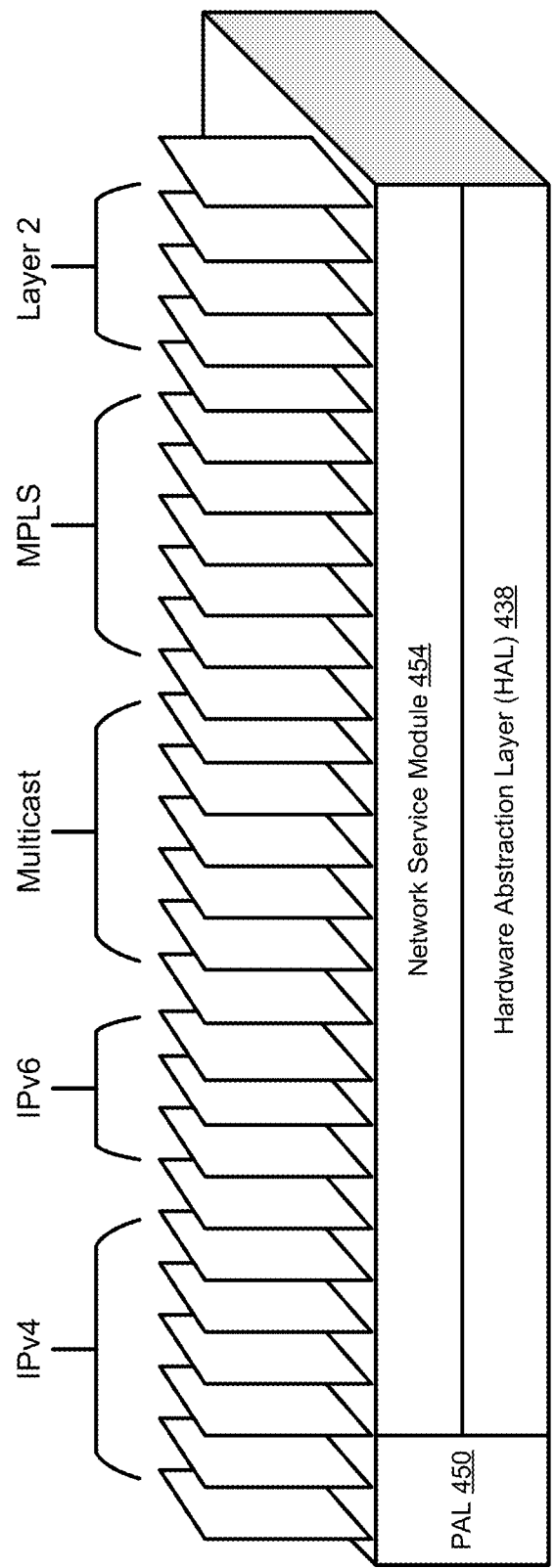

FIGS. 4A-4B illustrate example network operating system components in accordance with some embodiments. As shown in FIG. 4A, a network device 428 (e.g., an instance of the network device 202) is communicatively coupled to a policy server 414 (e.g., an instance of a policy server 220). The policy server 414 is communicatively coupled to an operations device 404 (e.g., an instance of the far-edge network server 224). The operations device 404 is coupled to a collector 402 (e.g., an instance of the near-edge network server 206). In some embodiments, the collector 402 is a standalone device (e.g., a dedicated switch device). In some embodiments, the collector 402 is a dedicated peering switch router. In some embodiments, the collector 402 is configured to listen in on data plane and control protocol messages (e.g., of the network device 428). In some embodiments, the collector 402 is configured for extract, transform, and load functions for the data plane traffic. In some embodiments, the collector 402 is configured for 25 gigabit, 100 gigabit, and/or 400 gigabit ethernet. In some embodiments, the collector 402 is configured to collect data at a transmit rate of the system (e.g., as the data is transmitted through the network). In some embodiments, the collector 402 is configured to mirror packet metadata of packets received at the network device 428. In some embodiments, the collector 402 pre-processes the network packets (e.g., strips the metadata and/or particular types of packets). In some embodiments, the collector 402 is a component of a router or switch device (e.g., the network device 428). In some embodiments, the collector 402 is, or includes, a data processing unit. In some embodiments, the collector 402 is configured to mirror network traffic.

The network device 428 includes an operating system 430 (e.g., a Linux operating system), infrastructure 440, a hardware specific layer (HSL) 436, communication modules 442, a worker node 432, and a management plane 444. The communication modules 442 may include a VLAN, xSTP, PTP, SyncE, and/or LACP module. The communication modules 442 may include an OSPF, ISIS, BGP, and/or VRRP module. The communication modules 442 may include a PIM-SM/DM, PIM, Bidir, IGMP, and/or MLD module. The communication modules 442 may include a segment routing (e.g., SR/MPLS and/or SRv6) module. The communication modules 442 may include an IP/MPLS (LDP/RSVP-TE), L2/L3 VPN module. The communication modules 442 may include an EVPN-based services module. The communication modules 442 may include a system management module. The communication modules 442 may include a carrier ethernet (e.g., CFM, EFM, Y1731, and/or 8031) module. The management plane 444 may be communicatively coupled 446 (e.g., via a NetConf, REST, GNMI, SNMP, and/or C-API channel) with one or more other network elements (e.g., the collector 402). The worker node 432 includes a policy agent 434 (e.g., an instance of the policy agent 204). In some embodiments, the infrastructure 440 includes NSM, RIB, and/or MRIB infrastructure. In some embodiments, the HSL 436 is communicatively coupled to the infrastructure 440 via a software subsystem (e.g., a hardware abstraction layer (HAL)). In some embodiments, the network device 428 is a switch and/or router device (e.g., an instance of an aggregation router 108). In some embodiments, the network device 428 is a whitebox device.

In some embodiments, the worker node 432 is a containerized module executing on the network device 428. In some embodiments, the worker node 432 is a cross-platform container. In some embodiments, the policy agent 434 of the worker node 432 subscribes to policy messages from a policy server (e.g., the policy server 414). In some embodiments, the worker node 432 implements end point policy (e.g., via access control lists (ACLs), traffic rules, and/or routing modifications). In some embodiments, the worker node 432 is part of an ETL pipeline for the operations device 404. In some embodiments, the worker node 432 is implemented as a docker container (e.g., a Linux container). In some embodiments, the worker node 432 operates as a node in a Kubernetes cluster. In some embodiments, the policy agent 434 of the worker node 432 is configured to subscribe to policy messages, apply received policies in a data plane of the network device 428, and/or establish an ETL pipeline to an external data processing unit (e.g., the data processing unit 300). In some embodiments, the worker node 432 is a control and policy service module. In some embodiments, the policy agent 434 is configured to communicate with a control plane of the network device.

In some embodiments, the infrastructure 440, HSL 436, and worker node 432 are components of a data plane of the network device 428 (e.g., the data plane 314). In some embodiments, the data plane is modular, scalable, and/or exchangeable. In some embodiments, the data plane is implemented on a system-on-a-chip or network application-specific integrated circuit (ASIC) component. In some embodiments, the data plane provides protocol and hardware services. In some embodiments, the communication modules 442 are components of a control plane (e.g., the control plane 310). In some embodiments, the control plane is modular, scalable, and/or fault tolerant. In some embodiments, the control plane provides open standards-based support (e.g., ITU, IEEE, OIF, IETF, OCP, TIP, and/or MEF). In some embodiments, the control plane provides container support for third-party applications. In some embodiments, the control plane provides protocol support, including L2, L3, routing, switching, MPLS, and/or data center and carrier ethernet networking. In some embodiments, the control plane is configured to make routing decisions. In some embodiments, the management plane 444 is transaction oriented. In some embodiments, the management plane 444 has a model-driven architecture.

The policy server 414 includes a message server 424 (for communicating with policy agents), a topic registry 422, an event publisher 420, an event generator 418, and a policy graph database server 416. The policy graph database server 416 communicates with one or more graph policy clients (e.g., the policy graph client 412). In some embodiments, the policy graph database server 416 communicates policy-based access control rules to the event generator 418. In some embodiments, the policy server 414 includes a graph-oriented database (e.g., the policy graph database server 416) for storing policy rules. In some embodiments, the policy server 414 implements a publish-subscribe message-oriented server (e.g., the message server 424). In some embodiments, the policy server 414 converts policy rules into policy messages (e.g., actionable insights). In some embodiments, the policy server 414 sends policy updates via policy messages (e.g., using a policy protocol). In some embodiments, the policy server 414 provides a mechanism to convert policies into flow specification rules (e.g., that can be shared via BGP) based on information received from the operations device 404. In some embodiments, the policy server 414 is configured to autonomously block and/or reroute anomalous traffic by issuing corresponding policy rules. In some embodiments, the policy server 414 is statically configured by a network administrator. In some embodiments, the policy server 414 is configured to augment existing policy rules (rather than overwrite existing rules). In some embodiments, the policy rules include one or more traffic policy rules, one or more security policy rules, and/or one or more routing policy rules (e.g., QoS traffic optimizations).

The operations device 404 includes an extract, transform, and load (ETL) module 406, a model training/evaluation module 408, a scoring module 410, and the graph policy client 412. In some embodiments, the operations device 404 intakes protocol metadata and applies pattern matching functions. In some embodiments, the metadata is time series data. In some embodiments, the operations device 404 generates machine models for machine learning operations. In some embodiments, the operations device 404 generates machine models based on training data and/or existing policy rules. In some embodiments, the operations device 404 provides inferences via network policy rules. In some embodiments, the operations device 404 is implemented at a cellular data center. In some embodiments, the ETL module 406 performs ETL operations on packet headers from the collector 402. In some embodiments, the operations device 404 is configured to provide real-time detection of network anomalies and/or malicious attacks. In some embodiments, the operations device 404 and the policy server 414 are co-located (e.g., located at a same data center). In some embodiments, the operations device 404 is configured to analyze raw packet metadata over a preset rolling window. In some embodiments, the operations device 404 is configured to verify predictions to identify suspicious packets, traffic patterns, and/or relationships. In some embodiments, the operations device 404 is configured to notify unacceptable behaviors and/or adapt network policies dynamically (e.g., in conjunction with the policy server 414). In some embodiments, the operations device 404 is configured to predict expected behavior based on empirical monitoring and/or acquired knowledge. In some embodiments, the operations device 404 is a component of a router or switch device. In some embodiments, the model training/evaluation module 408 includes a model for traffic classification, a model for traffic routing, and/or a model for network maintenance. In some embodiments, the model training/evaluation module 408 performs classification and/or regression-based analysis.

FIG. 4B illustrates example components of a network device (e.g., the network device 428) in accordance with some embodiments. The network device in FIG. 4B includes the HAL 438, a network service module 454, and a platform abstraction layer (PAL) 450. The network device in FIG. 4B further includes multiple protocol modules including IPv4, IPv6, multicast, MPLS, and layer 2 modules. In some embodiments, the IPV4 modules include RIPvVv2, OSPF-v2, BGP-4, IS-IS4, CSPF-OSPF, and/or CSPF-ISIS4 modules. In some embodiments, the IPV4 modules include RIPng, OSPF-v3, BGP-4+, and/or IS-IS5 modules. In some embodiments, the multicast modules include PM-SM, PM-SM v6, PM-DM, PM-DM v6, IGVP vVv2, and/or DVMPP modules. In some embodiments, the MPLS modules include LDP, RSVP-TE, DiffServ/DiffServ-TE, L2 VC, VPLS, L3VPN modules. In some embodiments, the layer 2 modules include VLANs (832 1pQ 832GVRP), Multicast (GMRP GMP Snooping), Spanning Tree (STP RSTP, MSTP), and/or PORT Authentication (802) modules. In some embodiments, the protocol modules include a hybrid switch router module.

Figure 5:
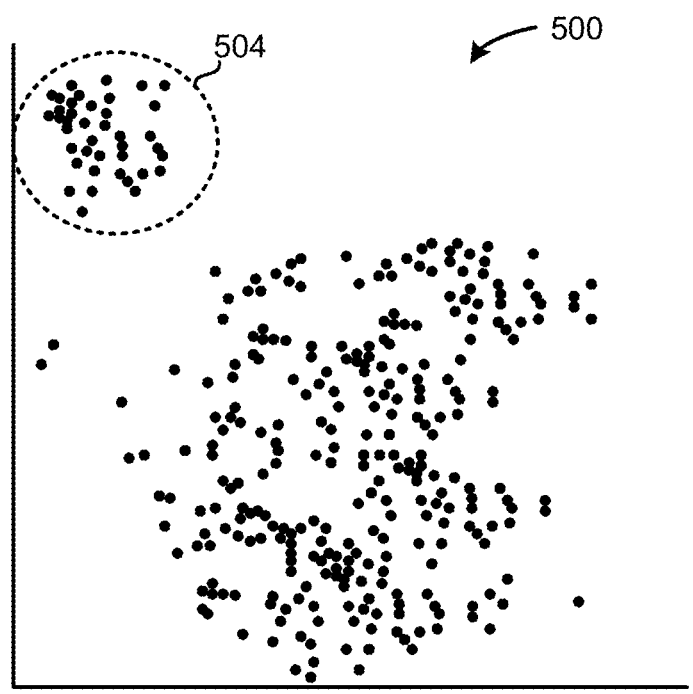
FIG. 5 illustrates an example plot of network data in accordance with some embodiments.

FIG. 5 illustrates an example plot of network data in accordance with some embodiments. For example, the network data 500 is plotted and outliers 504 are identified. In some embodiments, the network data includes routing data. Analysis of network data may be performed at the model training/evaluation module 408 and/or the scoring module 410. In some embodiments, the operations device 404 classifies the network data as either normal or anomalous. In some embodiments, the operations device 404 detects BGP routing security breaches and other anomalies based on the classified network data. In some embodiments, the model training/evaluation module 408 includes one or more supervised machine learning models and one or more unsupervised machine learning models. In some embodiments, the supervised machine learning model(s) include one or more of: a logistic regression model, a random forest model, a k-nearest neighbor (KNN) model, and a support vector machine (SVM) model. In some embodiments, the SVM model is a two-class classifier, where a 1 is output to indicate an anomaly and −1 (or 0) is output to indicate a non-anomaly. In some embodiments, the scoring module 410 performs real-time classification of network data (e.g., a binary classification). In some embodiments, labelled training samples are used to learn a classification hyperplane (e.g., at the model training/evaluation module 408). In some embodiments, a radial basis function (e.g., a kernel function) is used to transform the data to be linearly separable. In some embodiments, a gridsearch is used to select hyperparameters.

Figure 6A:
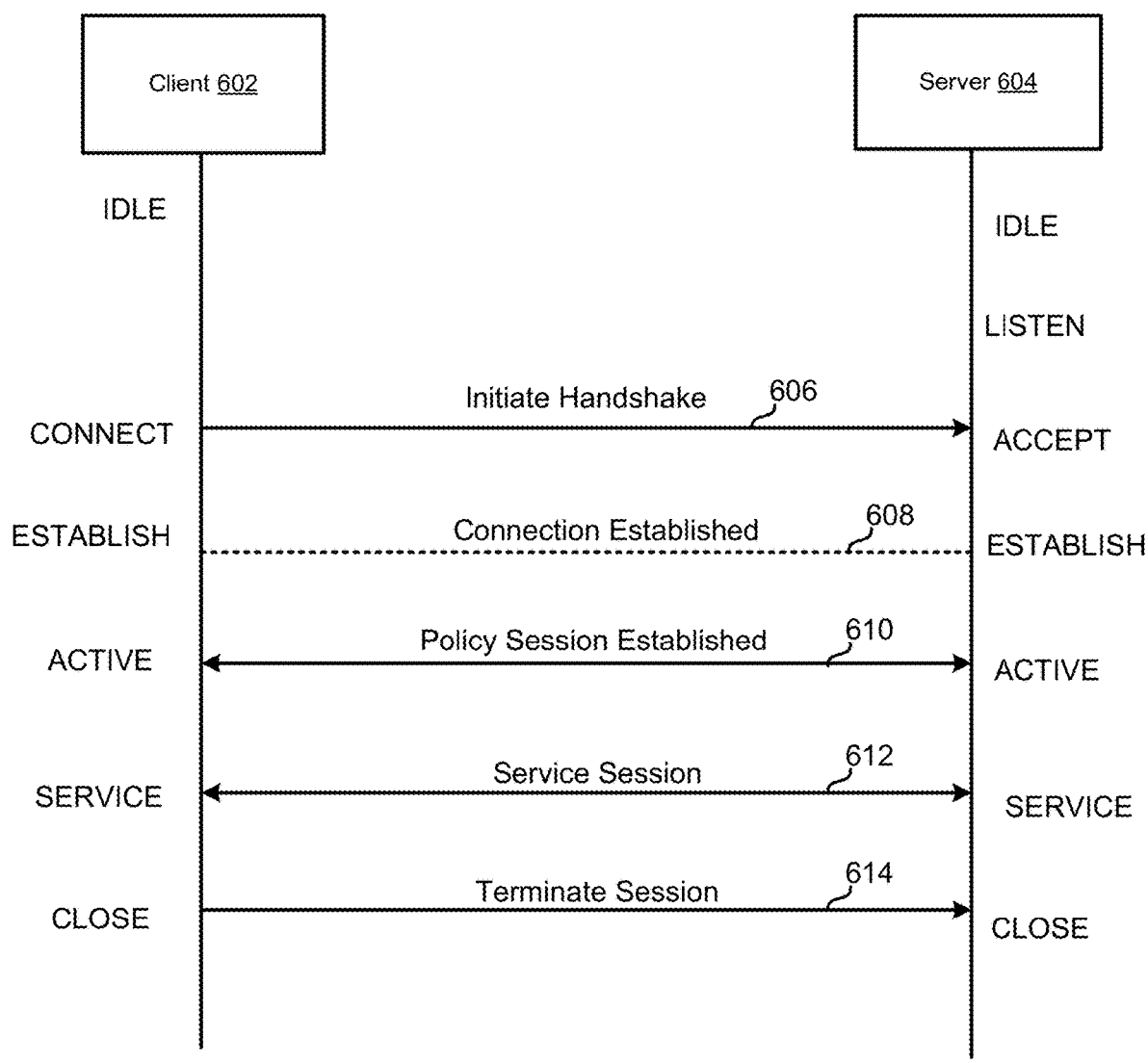
FIGS. 6A-6C illustrate example device communications in accordance with some embodiments.
Figure 6B:
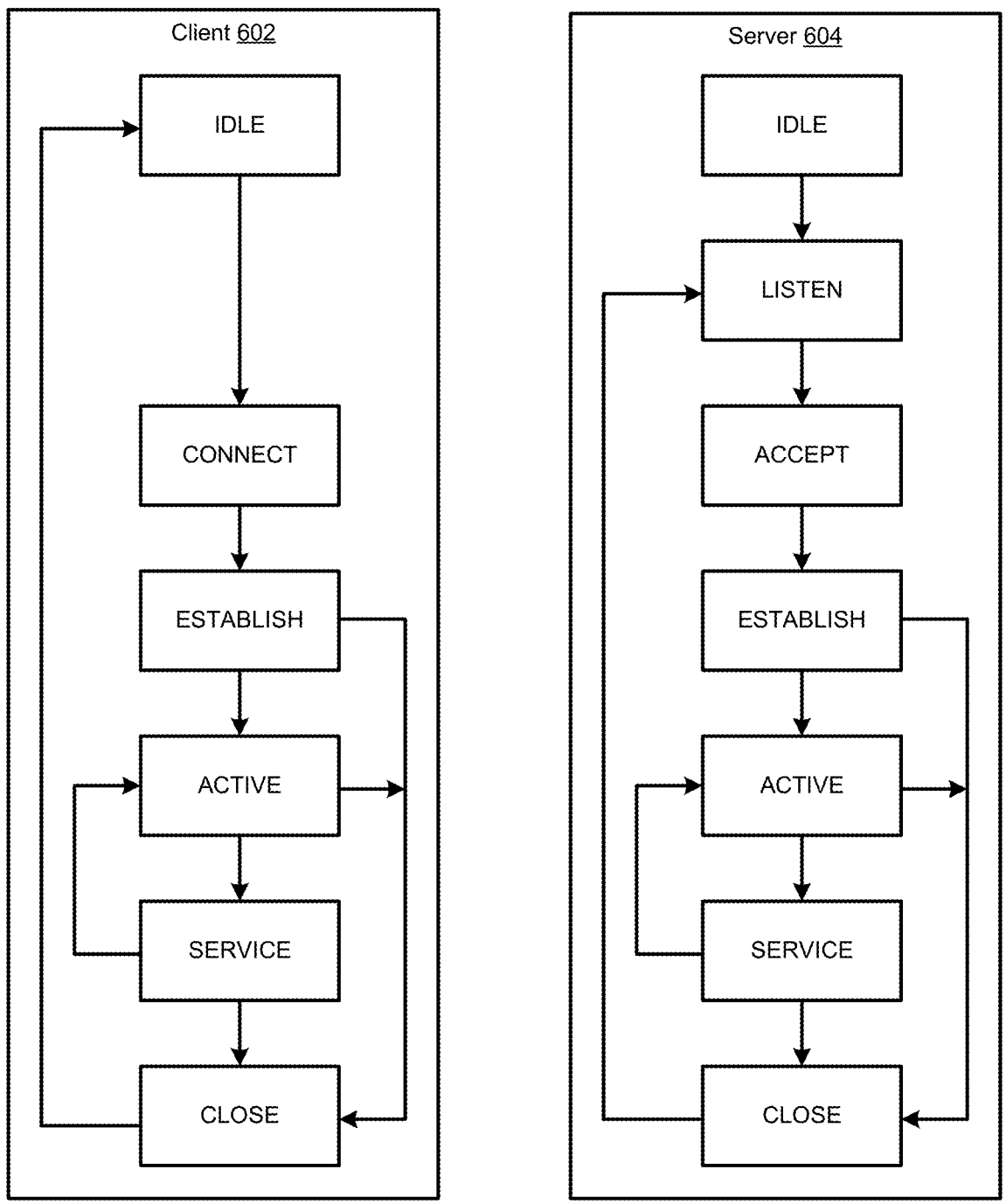
Figure 6C:
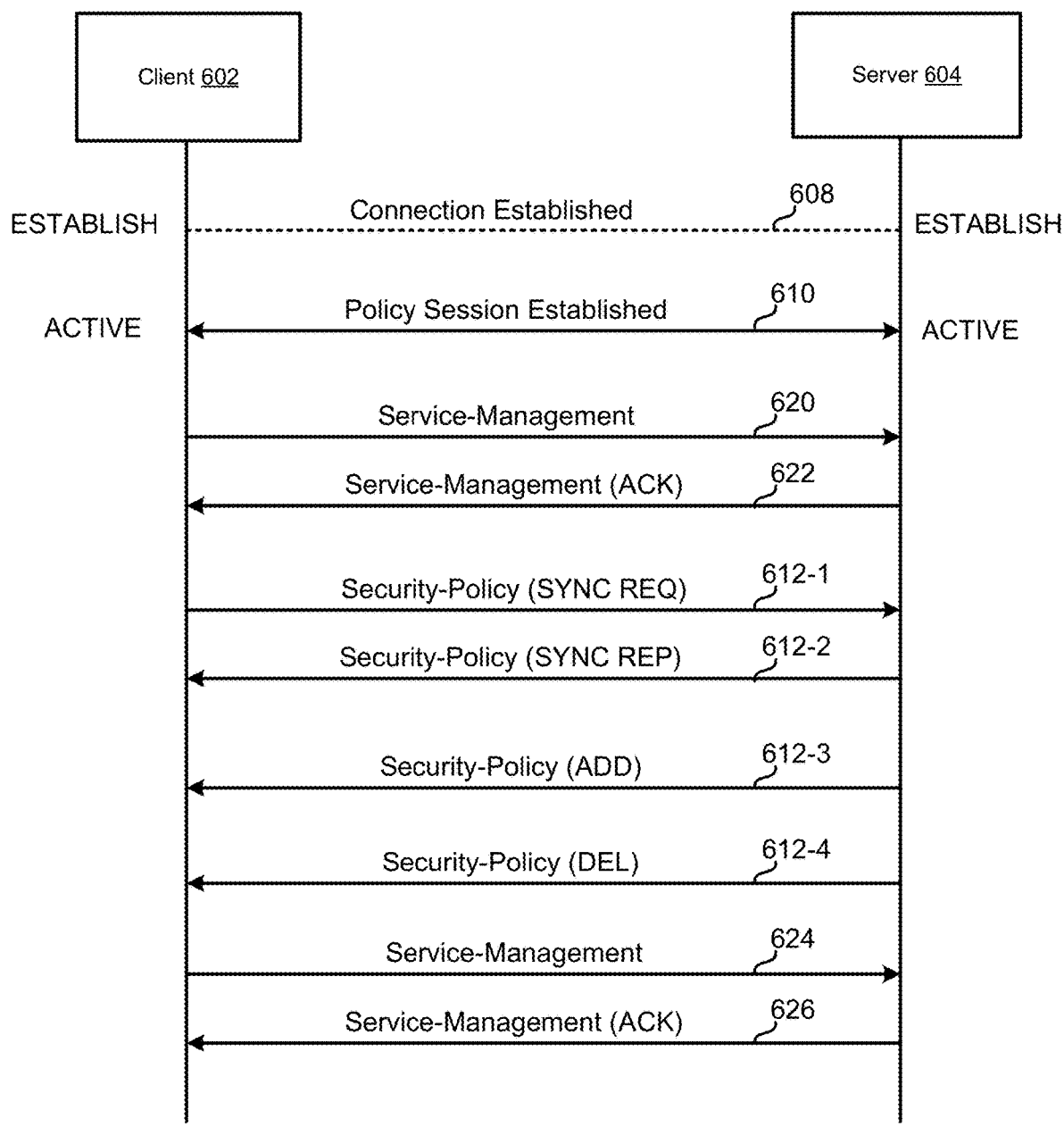

FIGS. 6A-6C illustrate example device communications in accordance with some embodiments. FIG. 6A illustrates example policy exchange protocol between a client 602 (e.g., the policy agent 204) and a server 604 (e.g., an instance of a policy server 220 or 213). FIG. 6B illustrates a finite state machine (FSM) version of the policy exchange protocol shown in FIG. 6A. In the example of FIG. 6A, the client 602 and the server 604 are initially idle, with the server 604 listening for incoming communications. At a first time, the client 602 initiates a handshake (606), which is accepted by the server 604 to establish a connection (608). After the connection is established, a policy session is established (610), and policy session services occur (612). After the policy session services complete the session is terminated (614), and optionally, the connection is terminated. In some embodiments, the connection is terminated in response to a user request to terminate. In some embodiments, the connection is terminated in accordance with a session establishment failing (e.g., a client cannot come to terms with the server). In some embodiments, establishing a policy session includes exchanging capabilities. In some embodiments, establishing a policy session includes the client 602 subscribing to the server 604 capabilities. In some embodiments, the policy session is maintained via keepalive messages. In some embodiments, after establishing the policy session, application specific messages are exchanged between the client 602 and the server 604. In some embodiments, the policy server is a policy translation gateway (e.g., for interworking with existing network architectures). In some embodiments, the policy translation gateway implements a native protocol (e.g., a policy exchange protocol). In some embodiments, the policy translation gateway implements a standards-based protocol, such as IETF, IEEE, and/or ITU-T (e.g., for BGP flow specification). In some embodiments, the policy translation gateway implements a proprietary protocol (e.g., via a plugin architecture).

FIG. 6C shows an example policy exchange protocol with multiple policy session services. First the connection is established (608) and then the policy session is established (610). Once the policy session is established, a service-management message (620) is sent to the server and acknowledged (622). A security policy synchronization request (612-1) is sent from the client 602 and the security policy synchronization reply (612-2) is sent from the server 604. In the example of FIG. 6C, a security policy add message (612-3) and a security policy delete message (612-4) are sent from the server 604. After the policy session services occur, a service management message (624) is sent from the client 602 and acknowledged (626) by the server 604. In some embodiments, the server 604 responds to an open message (a service-management message) with an acknowledgement message if the policy session is a success and responds with an error message if the policy session is a failure.

Figure 7A:
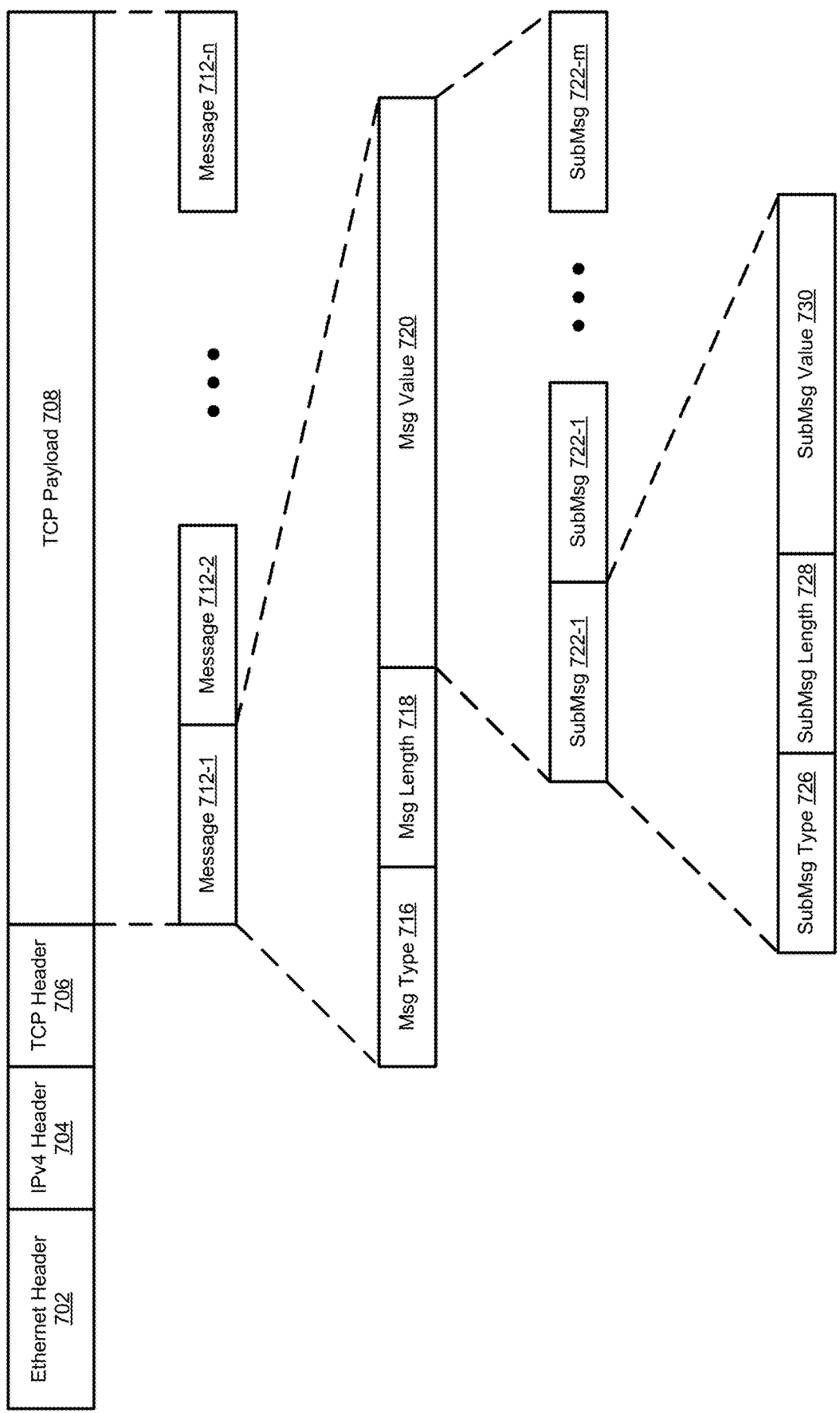

FIGS. 7A-7B illustrate example policy communications in accordance with some embodiments. FIG. 7A shows an example message that includes an ethernet header 702, an IPv4 header 704, a TCP header 706, and a TCP payload 708. The TCP payload 708 includes a plurality of messages 712-1 through 712-*n*. The message 712-1 includes a message type 716 (e.g., 2 bytes), a message length 718 (e.g., 2 bytes), and a message value 720. The message value 720 includes a plurality of submessages 722-1 through 722-*m*. The submessage 722-1 includes a submessage type 726 (e.g., 2 bytes), a submessage length 728 (e.g., 2 bytes), and a submessage value 730. In some embodiments, the policy messages use a non-TCP protocol (e.g., UDP). In some embodiments, the policy messages use a protocol buffer encoding. In some embodiments, the policy message use a time-length-value (TLV) encoding. In some embodiments, each message is encoded in TLV format. In some embodiments, each message includes one or more submessages that are encoded in TLV format.

FIG. 7B shows example policy messages in accordance with some embodiments. The synchronization request message 640 includes a message type 752-1, a message length 754-1, a synchronization request flag 758, and reserved bits 760-1. The synchronization reply 642 includes a message type 752-2, a message length 754-2, a table version 762-1, a synchronization reply flag 764, reserved bits 760-2, and policy objects 1 through n. The policy add message 644 includes a message type 752-3, a message length 754-3, a table version 762-2, an add flag 766, reserved bits 760-3, and policy objects 1 through m. The policy delete message 646 includes a message type 752-4, a message length 754-4, a table version 762-3, a delete flag 768, reserved bits 760-4, and policy identifiers 1 through p. The policy delete all message 648 includes a message type 752-5, a message length 754-5, a table version 762-4, a delete all flag 770, and reserved bits 760-5. In some embodiments, the table version 762, flag, and reserved bits form a common header (e.g., a 4-byte header). In some embodiments, a policy object includes a policy identifier (e.g., 2 bytes), a match component, and an action component. In some embodiments, the match component includes matching criteria, such as source and destination address prefixes, IP protocol, and transport protocol port numbers. In some embodiments, an action component has an action type, such as shape, rate limit, redirect, deny, permit, and drop.

In some embodiments, the match component includes a prefix component, a protocol-type component (e.g., all, TCP, UDP, or ICMP), a port-number component, a port-range component, a fragment component (e.g., DF or FF), a DSCP component, a TCP-flag component, and/or a packet-length component. In some embodiments, the match component includes one or more operators, such as a numeric operator and/or a bitmask operator. Example numeric operators include logical and, logical or, equals, less than, and greater than operators. An example bitmask operator is the NOT operator.

In some embodiments, a specific packet is considered to match a flow when it matches the intersection (AND) of all the components present under the expression. In some embodiments, components are required to follow strict type ordering by increasing numerical order. For example, a given component type may be present in the flow specification (e.g., exactly once). If present, it is required to precede any component of higher numeric type value. In some embodiments, all combinations of components within a single flow specification are allowed. However, some combinations cannot match any packets (e.g., "ICMP Type AND Port" will never match any packets) and thus should not be propagated.

In some embodiments, the message types include control messages (e.g., open, keepalive, notification, and service management messages) and service-specific messages (e.g., security/policy messages). In some embodiments, the control messages are used to establish/maintain a policy/service session. For example, a keepalive message is a heartbeat mechanism used to check if remote peer is still active. As another example, a notification message may be used to notify a peer of an error or reset condition. In some embodiments, a service management message allows the policy client to setup service session between the client and server. In some embodiments, service management messages include subscribe, unsubscribe, and acknowledgement messages. In some embodiments, the service-specific message include synchronization requests, synchronization replies, policy add messages, and/or policy delete messages.

Figure 8A:
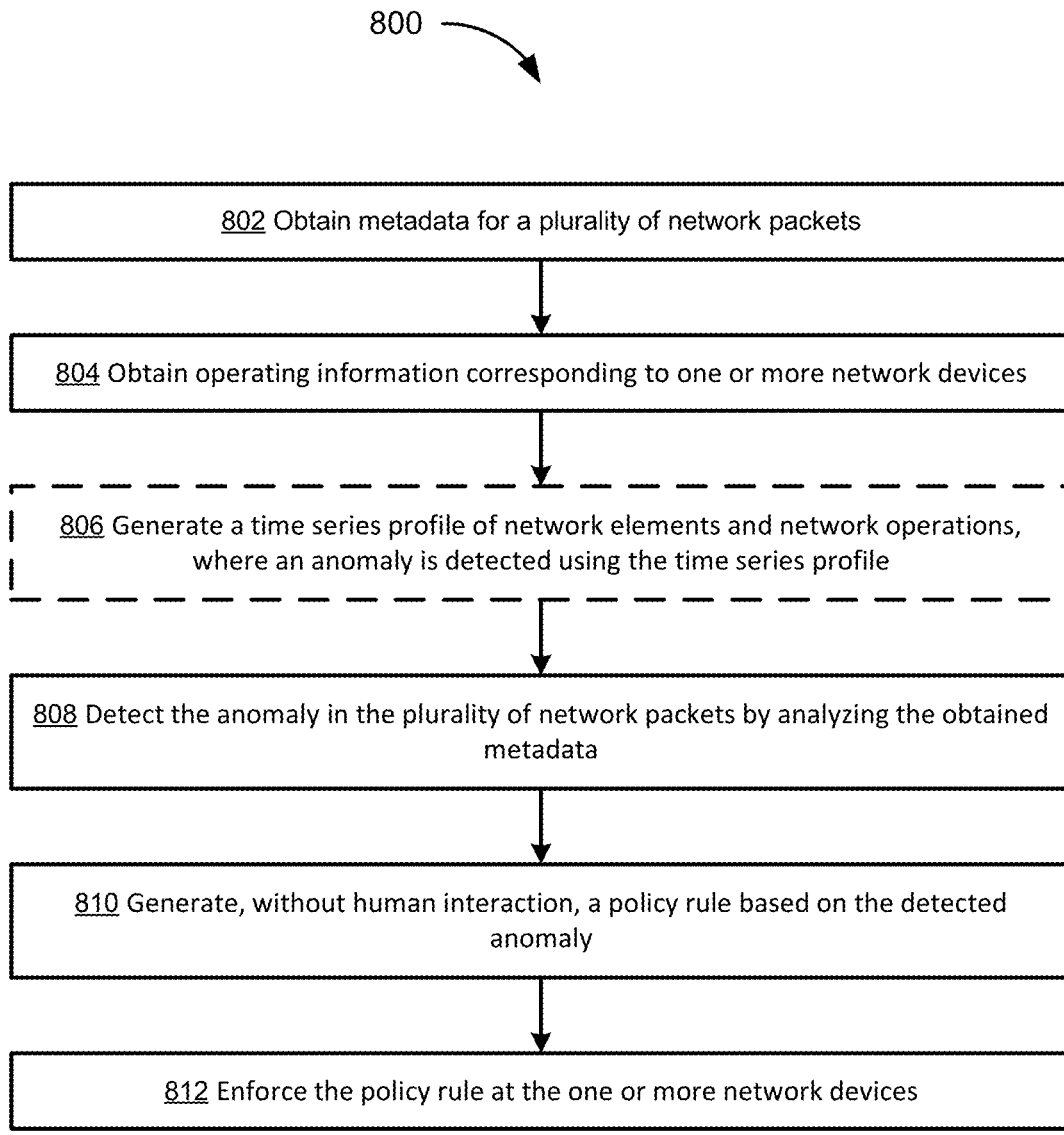
FIG. 8A is a flow chart illustrating a method of anomaly mitigation in accordance with some embodiments.

FIG. 8A is a flow chart illustrating a method 800 of anomaly mitigation in accordance with some embodiments. In some embodiments, the method 800 is performed at a network device (e.g., the network device 202 or the near-edge network server 206). In some embodiments, the method 800 is performed at network system (e.g., the network system 200). In some embodiments, the method 800 is performed at one or more of a network device (e.g., network device 202), a near-edge network server (e.g., near-edge network server 206), and a far-edge datacenter (e.g., far-edge datacenter 222). For clarity, the method 800 is described below as being performed by a network system.

The network system obtains (802) metadata for a plurality of network packets. For example, the network system obtains the metadata using the collector 402 and/or the ETL module 406. In some embodiments, the metadata includes packet header information. In some embodiments, the plurality of network packets includes one or more control protocol packets. In some embodiments, the network packets corresponds to an optical network, a microwave-based network, a cellular network, and/or an Internet network.

The network system obtains (804) operating information corresponding to one or more network devices. For example, the network system obtains operating information of the network device 202 and/or 428. In some embodiments, the metadata and/or operating information is obtained via a network collector device. In some embodiments, the operating information comprises one or more of: information about an operating state of the one or more network devices, information about a network state detected by the one or more network devices, and information about hardware and/or software of the one or more network devices. In some embodiments, the operating information includes telemetry data for a network device (e.g., obtained via the telemetry module 306). In some embodiments, the operating information includes information regarding a power supply of a network device, a transmit power of the network device, a temperature of the network device, a transmit quality of the network device, and/or operating system information from the network device.

In some embodiments, the network system generates (806) a time series profile of network elements and network operations, where an anomaly is detected using the time series profile. For example, the time series profile is generated using the model training/evaluation module 408. In some embodiments, the anomaly is detected using the scoring module 410.

The network system detects (808) the anomaly in the plurality of network packets by analyzing the obtained metadata. For example, the anomaly is detected using the model training/evaluation module 408 and/or the scoring module 410. In some embodiments, the anomaly is detected using pattern matching. In some embodiments, the anomaly is detected using one or more machine learning models. In some embodiments, the anomaly is detected via an operations device (e.g., the operations device 404). In some embodiments, the anomaly corresponds to a faulty network component. In some embodiments, the anomaly corresponds to malicious activity. In some embodiments, the anomaly is a routing anomaly.

The network system generates (810), without human interaction, a policy rule based on the detected anomaly. For example, the policy rule is generated using the operations device 404 and communicated to the policy server (e.g., sent via the graph policy client 412). In some embodiments, the policy rule includes an evaluation component and an action component. In some embodiments, generating the policy rule includes augmenting a pre-existing set of policy rules. For example, the network system identifies an anomaly, identifies a source of the anomaly, and generates a new policy rule for the source. For example, the new policy rule drops or reroutes data from the source.

The network system enforces (812) the policy rule at the one or more network devices. For example, the policy rule is transmitted to the policy agent 434, which enforces the policy rule at the network device 428. In some embodiments, enforcing the policy rule includes isolating and/or blocking matching packets. In some embodiments, the policy rule is enforced via respective policy agents implemented at each of the one or more network devices.

Figure 8B:
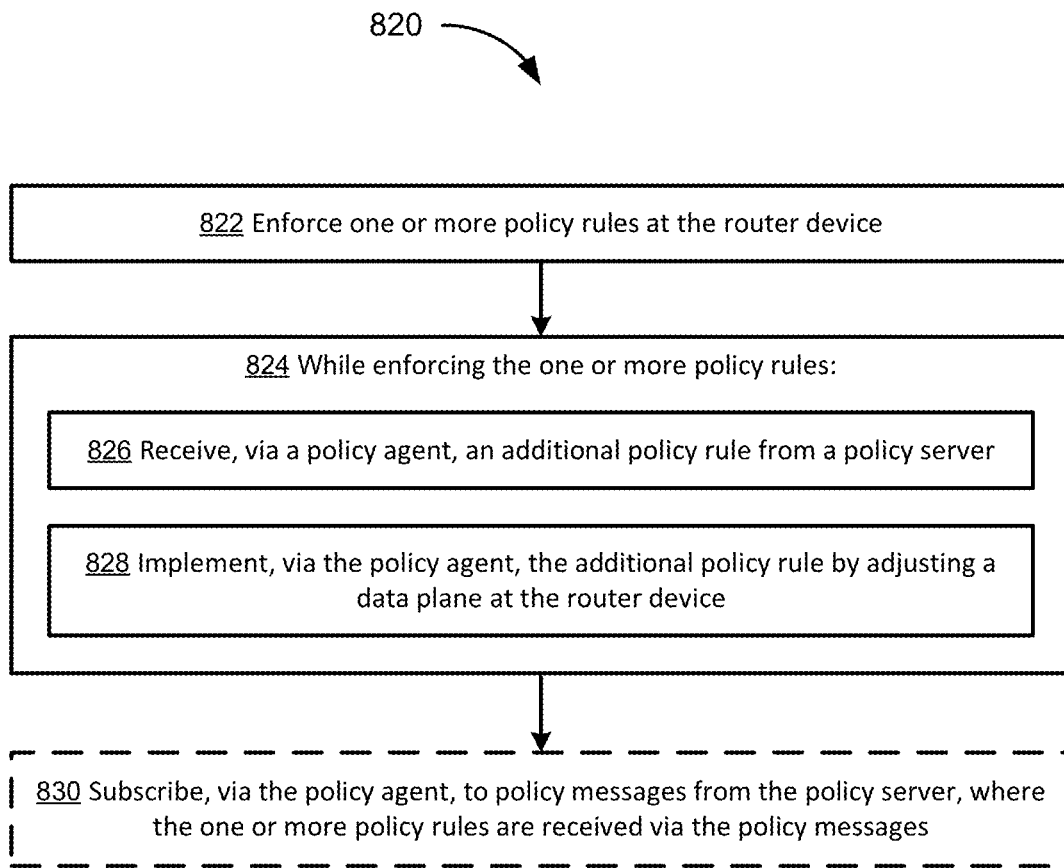
FIG. 8B is a flow chart illustrating a method of policy enforcement in accordance with some embodiments.

FIG. 8B is a flow chart illustrating a method 820 of policy enforcement in accordance with some embodiments. In some embodiments, the method 820 is performed at a network device (e.g., the network device 202). In some embodiments, the method 820 is performed at network system (e.g., the network system 200). For clarity, the method 820 is described below as being performed by a network device.

The network device enforces (822) one or more policy rules at the router device. For example, the network device enforces the one or more policy rules via the policy agent 204 and/or 434. In some embodiments, the one or more policy rules are enforced at the near-edge network server 206 via the policy agent 208. In some embodiments, the policy agent 208 is configured to communicate with one or more remote policy servers (e.g., the policy servers 220) via a policy protocol. In some embodiments, the policy agent is implemented as a worker node. In some embodiments, the policy agent is implemented in a control plane of the router device. In some embodiments, the policy agent is implemented as a docker container. In some embodiments, the one or more policy rules include one or more of: a traffic rule, a routing modification, and an access control list. In some embodiments, the router device is an aggregation router.

While enforcing the one or more policy rules (824): the network device receives (826), via a policy agent, an additional policy rule from a policy server. For example, the additional policy rule is received from the policy server 220-1 and/or 220-2.

While enforcing the one or more policy rules (824): the network device implements (828), via the policy agent, the additional policy rule by adjusting a data plane at the router device (e.g., the data plane 314). In some embodiments, adjusting the data plane includes writing the additional policy rule to content-addressable memory of the router device.

In some embodiments, the network device subscribes (830), via the policy agent, to policy messages from the policy server, where the one or more policy rules are received via the policy messages. For example, the policy agent 204 subscribes to the policy server 220-1.

Figure 8C:
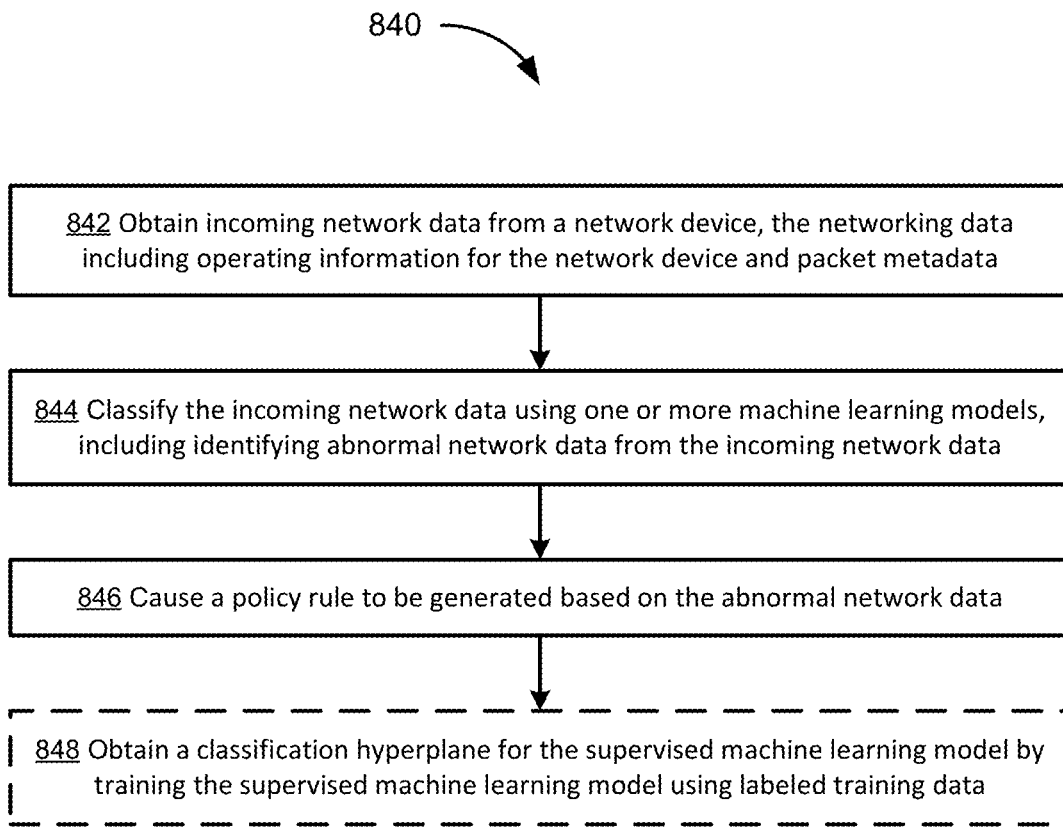
FIG. 8C is a flow chart illustrating a method of anomaly detection in accordance with some embodiments.

FIG. 8C is a flow chart illustrating a method 840 of anomaly detection in accordance with some embodiments. In some embodiments, the method 840 is performed at a network device (e.g., the near-edge network server 206). In some embodiments, the method 840 is performed at network system (e.g., the network system 200). For clarity, the method 840 is described below as being performed by a network system.

The network system obtains (842) incoming network data from a network device, the networking data including operating information (e.g., operational and control plane information) for the network device and packet metadata. For example, the network device is the network device 202. As another example, the network device is the network device 428 or the collector 402. In some embodiments, the incoming network data corresponds to a border gateway protocol (BGP) change. In some embodiments, the incoming network data comprises protocol metadata for one or more network packets. In some embodiments, the operating information comprises one or more of: information about an operating state of the network device, information about a network state detected by the network device, and information about hardware and/or software of the network device.

The network system classifies (844) the incoming network data using one or more machine learning models (e.g., via the model training/evaluation module 408), including identifying abnormal network data from the incoming network data. In some embodiments, the classification is a binary classification (e.g., normal or abnormal). In some embodiments, the one or more machine learning models include a support vector machine (SVM) model. In some embodiments, the one or more machine learning models include a logistic regression model, a random forest model, or a k-nearest neighbor (KNN) model. In some embodiments, the one or more machine learning models include an unsupervised deep learning model. In some embodiments, the one or more machine learning models include an SVM model and an unsupervised model. In some embodiments, the SVM model is trained on pre-labeled data and the unsupervised model is configured to learn autonomously. In some embodiments, the unsupervised model is configured to learn via a series of rewards and penalties. In some embodiments, the one or more machine learning models include a model for network traffic analysis, a model for network security analysis, and/or a model for network maintenance analysis. In some embodiments, the incoming network data is classified in real time. In some embodiments, classifying the incoming network data includes performing a two-class classification. In some embodiments, classifying the incoming network data includes performing a radial basis function to linearly-separate the incoming network data.

The network system causes (846) a policy rule to be generated based on the abnormal network data. For example, the policy is generated at an operations device (e.g., the operations device 404) and shared with the policy server 414 via the graph policy client 412 and policy graph DB server 416.

In some embodiments, the network system obtains (848) a classification hyperplane for the supervised machine learning model by training the supervised machine learning model using labeled training data.

Turning now to some example embodiments of the methods, devices, systems, and computer-readable storage media described earlier.

(A1) In one aspect, some embodiments include a method (e.g., the method 800) of anomaly mitigation. In some embodiments, the method is performed at a network device (e.g., the network device 202) having memory and one or more processors. In some embodiments, the method is performed at a network system (e.g., the network system 200) having memory and one or more processors. The method includes: (i) obtaining metadata for a plurality of network packets; (ii) obtaining operating information corresponding to one or more network devices; (iii) detecting an anomaly in the plurality of network packets by analyzing the obtained metadata; (iv) generating, without human interaction, a policy rule based on the detected anomaly; and (v) enforcing the policy rule at the one or more network devices. In some embodiments, the anomaly detection is used to predict a failure point and preemptively reroute traffic.

(A2) In some embodiments of A1, the policy rule is enforced via respective worker nodes implemented at each of the one or more network devices. In some embodiments, each network device of the one or more network devices includes a respective policy agent (a policy control module). In some embodiments, each network device has a policy agent within a worker node that communicates with a policy server. In some embodiments, the policy agent includes a docker container implemented at a control plane. In some embodiments, a respective worker node is a node of a Kubernetes cluster. In some embodiments, each policy agent subscribes to policy messages from a policy server that generates and/or propagates the policy rule. In some embodiments, the policy agent is configured to implement endpoint policy (e.g., traffic rules, routing modifications, and access control lists). In some embodiments, the policy rule is enforced via a policy agent implemented at a network device. In some embodiments, the network device is a router and/or switch device. For example, the network device is an aggregation router in a service provider network.

(A3) In some embodiments of A1 or A2, the metadata includes packet header information. In some embodiments, the packet header information includes a version number, a length, a service type, a packet identifier, a source IP address, a destination IP address, and/or checksum data.

(A4) In some embodiments of any of A1-A3, the plurality of network packets includes one or more control protocol packets. For example, a transmission control protocol (TCP) packet.

(A5) In some embodiments of any of A1-A4, the method further includes generating a time series profile of network elements and network operations, where the anomaly is detected using the time series profile. For example, the time series profile combines different time series types and assigns locations.

(A6) In some embodiments of any of A1-A5, the anomaly is detected using pattern matching. For example, the anomaly is detected by testing a network packet to determine if it has particular characteristics.

(A7) In some embodiments of any of A1-A6, the anomaly is detected using one or more machine learning models (e.g., models maintained at the operations device 404). In some embodiments, the machine learning models include one or more of: a logistic regression model, a random forest model, a decision tree model, a k-nearest neighbors (KNN) model, and a support vector machine (SVM) model. In some embodiments, the one or more machine learning models include a two-class classifier (e.g., configured to output a value of 1 to indicate an anomaly and output a value of 0 to indicate standard/ normal data).

(A8) In some embodiments of any of A1-A7, the metadata is obtained via a network collector device (e.g., the collector 402). In some embodiments, the network collector device is configured to collect data at a transmit rate of the network. In some embodiments, the network collector device is configured to passively monitor/extract packet metadata. In some embodiments, the router mirrors received network data and sends the mirrored data to a near-edge server for anomaly analysis.

(A9) In some embodiments of any of A1-A8, the anomaly is detected via an operations device (e.g., the operations device 404). In some embodiments, the anomaly detection is performed at a cellular data center. In some embodiments, the anomaly detection is performed at a far-edge server. In some embodiments, the anomaly detection is performed at a near-edge server (e.g., at a server co-located with the router providing the packet data).

(A10) In some embodiments of any of A1-A9, the policy rule is generated via an operations device (e.g., the operations device 404). In some embodiments, the policy rule is promulgated by a policy server that receives the policy rule from the operations device. In some embodiments, the policy server includes a policy graph database, an event generator, an event publisher, a topic registry, and a messenger component. In some embodiments, the policy server is a far-edge server. In some embodiments, the policy server is a component of a far-edge network server (e.g., the far-edge network server 224) and/or a public cloud. In some embodiments, the policy server is a near-edge server (e.g., at a server co-located with the router providing the packet data). In some embodiments, the policy server is a component of a near-edge server (e.g., near-edge network server 206).

(A11) In some embodiments of any of A1-A10, the anomaly corresponds to malicious activity (e.g., a DDOS attack).

(A12) In some embodiments of any of A1-A11, the anomaly includes a routing anomaly. For example, the anomaly corresponds to a change in a border gateway protocol (BGP) routing.

(A13) In some embodiments of any of A1-A10, the anomaly corresponds to a faulty network component. For example, a network component having a memory or switching error.

(A14) In some embodiments of any of A1-A13, the network packets corresponds to an optical network, a microwave-based network, a cellular network, and/or an Internet network.

(A15) In some embodiments of any of A1-A14, the policy rule includes an evaluation component and an action component (e.g., as described previously with respect to FIGS. 7A-7B).

(A16) In some embodiments of any of A1-A15, generating the policy rule includes augmenting a pre-existing set of policy rules. For example, the generated policy rule is an update to an existing policy rule. In another example, the generated policy rule supplements the pre-existing set of policy rules.

(A17) In some embodiments of any of A1-A16, the operating information includes one or more of: information about an operating state of the one or more network devices, information about a network state detected by the one or more network devices, and information about hardware and/or software of the one or more network devices. In some embodiments, the operating information includes information about a power supply, a communication channel strength, an operating temperature, and/or a signal strength.

(B1) In another aspect, some embodiments include a network device (e.g., the network device 428 or the data processing unit 300). The network device includes: (i) a network interface component (e.g., the network interface 210) configured to obtain network packets in real time from a router device; (ii) a data processing unit (e.g., the data processor(s) 212) configured to extract packet metadata from the network packets; and (iii) a policy component (e.g., the policy server 213) configured to provide a policy rule to the router device, the policy rule generated based on an analysis of the packet metadata. In some embodiments, the network device is configured to perform the methods described herein (e.g., A1-17, C1-C8, and/or D1-D17). In some embodiments, the network device is configured to pre-process the network packets (e.g., discard irrelevant packet information). In some embodiments, the network interface component is a PCI-express switch.

(B2) In some embodiments of B1, the router device is an aggregation router device (e.g., an aggregation router 108). In some embodiments, the router device is a network element in a service provider network. In some embodiments, the router device is a network element which is deployed within a service provider network as part of access, aggregation, datacenter, core, or transport.

(B3) In some embodiments of B1 or B2, the network device (e.g., the network interface component) is further configured to obtain operating information (e.g., telemetry information and/or operating conditions of the router device) from the router device, and the policy rules are further generated based on an analysis of the operating information.

(B4) In some embodiments of B3, the operating information includes one or more of: information about an operating state of the router device, information about a network state detected by the router device, and information about hardware and/or software of the router device. In some embodiments, the operating information includes information about a power supply, a communication channel strength, an operating temperature, and/or a signal strength.

(B5) In some embodiments of any of B1-B4, the network device further includes a machine learning component (e.g., the parallel processor(s) 211) configured to analyze the packet metadata and provide an inference based on the analysis.

(B6) In some embodiments of B5, the network device further includes a policy component (e.g., the policy server 213) configured to generate the policy rule based on the inference.

(B6) In some embodiments of B5 or B6, the machine learning component includes a graphics processing unit (or other parallel processor).

(B7) In some embodiments of any of B1-B6, the network device is configured to: (i) provide the packet metadata to a remote server (e.g., the far-edge network server 224); and (ii) in response to providing the packet metadata, receive the policy rule from the remote server (e.g., via a policy server 220). In some embodiments, the network device stores an ML dataset and/or raw data in a storage (e.g., a near-edge storage), e.g., which is used by the remote server to train ML data models. In some embodiments, the training results in a new inference model which can be loaded in the network device (e.g., a near-edge network server) to generate new updated policy rules.

(B8) In some embodiments of any of B1-B7, the network interface component is configured to receive the network packets at a variable rate. In some embodiments, the variable rate is in a range from 10 to 800G. In some embodiments, the variable rate is based on a network bandwidth of the router device.

(B9) In some embodiments of any of B1-B8, the network interface component and the data processing unit are communicatively coupled via a communication bus. For example, the communication bus is a PCI-express bus.

(B10) In some embodiments of any of B1-B9, the network interface component is a smart network interface card. In some embodiments, the smart network interface card is configured to receive data at a variable speed (e.g., corresponding to a traffic speed of the network).

(C1) In another aspect, some embodiments include a method (e.g., the method 820) of policy enforcement. In some embodiments, the method is performed at a network device (e.g., the network device 202) having memory and one or more processors. In some embodiments, the method is performed at a network system (e.g., the network system 200) having memory and one or more processors. The method includes: (i) enforcing one or more policy rules at the router device; and (ii) while enforcing the one or more policy rules: (a) receiving, via a policy agent, an additional policy rule from a policy server; and (b) implementing, via the policy agent, the additional policy rule by adjusting a data plane at the router device.

(C2) In some embodiments of C1, the policy agent is implemented within a worker node (e.g., a node of a Kubernetes cluster). In some embodiments, the policy agent is a component of a worker node.

(C3) In some embodiments of C1 or C2, the policy agent is implemented in a control plane of a network device. For example, the network device includes a data plane, a control plane, and a management plane.

(C4) In some embodiments of any of C1-C3, the policy agent is implemented as a docker container. In some embodiments, the policy agent is a component of a docker container.

(C5) In some embodiments of any of C1-C4, the method further includes subscribing, via the policy agent, to policy messages from the policy server, where the one or more policy rules are received via the policy messages. For example, the messages are received from the message server 424.

(C6) In some embodiments of any of C1-C5, the one or more policy rules include one or more of: a traffic rule, a routing modification, an access control list. In some embodiments, the policy rules include a set of traffic rules and/or a set of routing rules.

(C7) In some embodiments of any of C1-C6, the network device is an aggregation router. In some embodiments, the network device is a component of an access, aggregation, transport, core, and/or data center network. In some embodiments, the network device is a network element deployed in a service provider network.

(C8) In some embodiments of any of C1-C7, adjusting the data plane includes writing the additional policy rule to content-addressable memory of the network device. In some embodiments, adjusting the data plane includes adjusting the content-addressable memory to filter in accordance with the additional policy rule.

(D1) In another aspect, some embodiments include a method (e.g., the method 840) of anomaly detection. In some embodiments, the method is performed at a network device (e.g., the network device 202) having memory and one or more processors. In some embodiments, the method is performed at a network system (e.g., the network system 200) having memory and one or more processors. The method includes: (i) obtaining incoming network data from a network device, the networking data including operating information for the network device and packet metadata; (ii) classifying the incoming network data using one or more machine learning models, including identifying abnormal network data from the incoming network data; and (iii) causing a policy rule to be generated based on the abnormal network data. In some embodiments, the network data is analyzed to predict traffic density (and a policy rule is generated to load balance the traffic). In some embodiments, the incoming network data is real-time network traffic and/or operational data of the network device.

(D2) In some embodiments of D1, the one or more machine learning models include a support vector machine (SVM) model.

(D3) In some embodiments of D1 or D2, the one or more machine learning models include a logistic regression model, a random forest model, and/or a k-nearest neighbor (KNN) model.

(D4) In some embodiments of any of D1-D3, the one or more machine learning models include an unsupervised deep learning model.

(D5) In some embodiments of any of D1-D4, the one or more machine learning models include an SVM model and an unsupervised model.

(D6) In some embodiments of D5, the SVM model is trained on pre-labeled data and the unsupervised model is configured to learn autonomously. For example, the SVM model is trained at the model training/evaluation module 408.

(D7) In some embodiments of D5 or D6, the unsupervised model is configured to learn via a series of rewards and penalties. For example, the unsupervised model is, or includes, a generative adversarial network.

(D8) In some embodiments of any of D1-D7, the one or more machine learning models include a model for network traffic analysis, a model for network security analysis, and/or a model for network maintenance analysis. In some embodiments, network packets are analyzed by each model to determine any anomalies.

(D9) In some embodiments of any of D1-D8, the classifying the incoming network data is performed in real time. For example, the classification includes a real-time inference. In some embodiments, the classification includes pattern-matching by the supervised machine learning model.

(D10) In some embodiments of any of D1-D9, the incoming network data corresponds to a border gateway protocol (BGP) change. For example, the BGP change is analyzed to determine if it is valid and/or efficient.

(D11) In some embodiments of any of D1-D10, the incoming network data includes protocol metadata for one or more network packets. In some embodiments, the incoming network data includes packet header information for each of the one or more network packets.

(D12) In some embodiments of any of D1-D11, classifying the incoming network data includes performing a two-class (binary) classification.

(D13) In some embodiments of any of D1-D12, the method further includes obtaining a classification hyperplane for the supervised machine learning model by training the supervised machine learning model using labeled training data.

(D14) In some embodiments of any of D1-D13, the method is performed at the network device. For example, the method is performed at a router and/or switch device.

(D15) In some embodiments of any of D1-D14, classifying the incoming network data includes performing a radial basis function to linearly-separate the incoming network data.

(D16) In some embodiments of any of D1-D15, the operating information includes one or more of: information about an operating state of the network device, information about a network state detected by the network device, and information about hardware and/or software of the network device. In some embodiments, the operating information includes information about a power supply, a communication channel strength, an operating temperature, and/or a signal strength.

(E1) In another aspect, some embodiments include a method of policy enforcement. In some embodiments, the method is performed at a network device (e.g., the network device 202) having memory and one or more processors. In some embodiments, the method is performed at a network system (e.g., the network system 200) having memory and one or more processors. The method includes: (i) receiving a connect request from a remote device (e.g., the client 602); (ii) establishing a communication channel in response to receiving the connect request; (iii) establishing a policy session using the established communication channel; and (iv) providing one or more service messages to the remote device via the policy session.

(E2) In some embodiments of E1, the one or more service messages include a synchronization message (e.g., the synchronization reply message 642), a policy add message (e.g., the policy add message 644), and/or a policy delete message (e.g., the policy delete message 646 or the policy delete all message 648).

(E3) In some embodiments of E1 or E2, the method further comprises terminating the policy session after providing the one or more service messages (e.g., via the terminate session operation 614). In some embodiments, the session is terminated in response to a user request. In some embodiments the session is terminated in response to inconsistencies between the client and the server.

(E4) In some embodiments of any of E1-E3, the one or more service messages include two or more types of service messages.

(E5) In some embodiments of E4, each type of service message includes one or more bits indicating a message type (e.g., the message type 752), one or more bits indicating a message length (e.g., the message length 754), and one or more bits type-specific bits.

(E6) In some embodiments of any of E1-E5, the communication channel is a TCP connection.

(E7) In some embodiments of any of E1-E6, each of the one or more service messages includes an ethernet header, an IP header, and a payload. In some embodiments, each of the one or more service messages includes a TCP header. In some embodiments, the payload is a TCP payload. In some embodiments, the payload is composed of a plurality of messages. In some embodiments, each message of the plurality of messages includes a plurality of submessages.

In another aspect, some embodiments include a computing system including one or more processors and memory coupled to the one or more processors, the memory storing one or more programs configured to be executed by the one or more processors, the one or more programs including instructions for performing any of the methods described herein (e.g., methods 800, 820, and 840 and A1-A17, C1-C8, D1-D16, and E1-E7 above).

In yet another aspect, some embodiments include a non-transitory computer-readable storage medium storing one or more programs for execution by one or more processors of a computing system, the one or more programs including instructions for performing any of the methods described herein (e.g., methods 800, 820, and 840 and A1-A17, C1-C8, D1-D16, and E1-E7 above).

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first and second are, in some instances, used herein to describe various elements, these elements should not be limited by these terms. These terms are used only to distinguish one element from another.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope to the precise forms disclosed. Many modifications and variations are possible in view of the above teachings. The embodiments were chosen and described in order to best explain the main principles and practical applications, to thereby enable others skilled in the art to best utilize the various embodiments and make various modifications as are suited to the particular use contemplated.

What is claimed is:

1. A network server, comprising:
   a network interface component configured to obtain network packets in real time from a router device physically co-located with the network server;

a network collector component that is physically co-located with the router device and is configured to mirror packet metadata from the network packets, wherein the mirrored packet metadata is distinct from the network packets;

a data processing unit that is physically co-located with the router device and configured to evaluate the mirrored packet metadata from the network packets, wherein the mirrored packet metadata comprises packet header information; and a policy component that is physically co-located with the router device and configured to:
generate a policy rule based on an analysis of the packet header information of the mirrored packet metadata; and
provide the policy rule to the router device.

2. The network server of claim 1, wherein the router device is an element of a service provider network.

3. The network server of claim 1, wherein the network interface component is further configured to obtain operating information from the router device, and wherein policy rules are further generated based on an analysis of the operating information.

4. The network server of claim 3, wherein the operating information comprises one or more of: information about an operating state of the router device, information about a network state detected by the router device, and information about hardware and/or software of the router device.

5. The network server of claim 1, further comprising a machine learning component that is physically co-located with the router device and configured to analyze the mirrored packet metadata and provide an inference based on the analysis, wherein the inference includes classifying the incoming network data and identifying abnormal network data.

6. The network server of claim 5, wherein the policy component is configured to generate the policy rule based on the inference.

7. The network server of claim 5, wherein the machine learning component comprises a graphics processing unit.

8. The network server of claim 1, wherein the network server is configured to:
provide the mirrored packet metadata to a remote server; and
in response to providing the mirrored packet metadata, receive the policy rule from the remote server.

9. The network server of claim 1, wherein the network interface component is configured to receive the network packets at a variable rate.

10. The network server of claim 1, wherein the network interface component and the data processing unit are communicatively coupled via a communication bus.

11. The network server of claim 1, wherein:
the packet header information indicates time series data; and
the policy rule is generated based on an analysis of the time series data indicated by the packet header information of the mirrored packet metadata.

12. The network server of claim 1, wherein the network server is a near-edge network server, and wherein each component of the near-edge network server is co-located with the router device.

13. The network server of claim 1, wherein the network collector component is configured to mirror packet metadata at a transmit rate of the router device.

14. The network server of claim 1, wherein the plurality of network packets correspond to one or more of an optical network, a microwave-based network, and a cellular network.

15. A method, comprising:
obtaining, via a network interface component, a plurality of network packets in real time from a router device physically co-located with a network server;
mirroring, via a network collector component that is physically co-located with the router device, packet metadata from the plurality of network packets, wherein the mirrored packet metadata is distinct from the plurality of network packets;
evaluating, via a data processing unit that is physically co-located with the router device, the mirrored packet metadata from the plurality of network packets, wherein the mirrored packet metadata comprises packet header information;
generating a policy rule based on an analysis of the packet header information of the mirrored packet metadata; and
providing, via a policy component that is physically co-located with the router device, the policy rule to the router device.

16. The method of claim 15, further comprising obtaining operating information from the router device, wherein policy rules are further generated based on an analysis of the operating information.

17. The method of claim 15, further comprising providing an inference, via a machine learning component that is co-located with router device, by analyzing the mirrored packet metadata, wherein:
the inference includes classifying the incoming network data and identifying abnormal network data, and the policy rule is generated based on the inference.

18. A non-transitory computer-readable storage medium storing one or more sets of instructions configured for execution by a computing system having control circuitry and memory, the one or more sets of instructions comprising instructions for:
obtaining, via a network interface component, a plurality of network packets in real time from a router device physically co-located with a network server;
mirroring, via a network collector component that is physically co-located with the router device, packet metadata from the plurality of network packets, wherein the mirrored packet metadata is distinct from the plurality of network packets;
evaluating, via a data processing unit that is physically co-located with the router device, the mirrored packet metadata from the plurality of network packets, wherein the mirrored packet metadata comprises packet header information;
generating a policy rule based on an analysis of the packet header information of the mirrored packet metadata; and
providing, via a policy component that is physically co-located with the router device, the policy rule to the router device.

19. The non-transitory computer-readable storage medium of claim 18, wherein the one or more sets of instructions further comprise instructions for obtaining operating information from the router device, and wherein policy rules are further generated based on an analysis of the operating information.

20. The non-transitory computer-readable storage medium of claim 19, wherein the operating information comprises one or more of: information about an operating state of the router device, information about a network state detected by the router device, and information about hardware and/or software of the router device.

* * * * *